US008001221B2

(12) United States Patent
Tameshige et al.

(10) Patent No.: US 8,001,221 B2
(45) Date of Patent: Aug. 16, 2011

(54) METHOD OF BUILDING SYSTEM AND MANAGEMENT SERVER

(75) Inventors: Takashi Tameshige, Tokyo (JP);
Yoshifumi Takamoto, Kokubunji (JP);
Keisuke Hatasaki, Kawasaki (JP);
Kazuhide Aikoh, Yokohama (JP);
Yujirou Ichikawa, Yokohama (JP);
Takeshi Teramura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 12/388,039

(22) Filed: Feb. 18, 2009

(65) Prior Publication Data
US 2010/0115077 A1    May 6, 2010

(30) Foreign Application Priority Data

Oct. 30, 2008  (JP) ................................. 2008-280313

(51) Int. Cl.
*G06F 15/177* (2006.01)

(52) U.S. Cl. ........ 709/220; 709/221; 709/222; 709/217; 709/219; 709/226; 713/1; 713/2

(58) Field of Classification Search .................. 709/220, 709/221, 222, 226, 217, 219; 713/1, 2
See application file for complete search history.

(56) References Cited

U.S. PATENT DOCUMENTS

| 7,127,603 | B2 * | 10/2006 | Rangarajan et al. ............... 713/2 |
| 2005/0034125 | A1 * | 2/2005 | Guy et al. ...................... 718/100 |
| 2005/0108515 | A1 * | 5/2005 | Rangarajan et al. ............... 713/2 |
| 2007/0276897 | A1 * | 11/2007 | Tameshige et al. ............ 709/201 |
| 2008/0294888 | A1 * | 11/2008 | Ando et al. ....................... 713/2 |
| 2009/0157858 | A1 * | 6/2009 | Bolan et al. .................... 709/223 |
| 2010/0024001 | A1 * | 1/2010 | Campbell et al. ................. 726/2 |

FOREIGN PATENT DOCUMENTS

JP    2007-148714    6/2007

* cited by examiner

*Primary Examiner* — Dohm Chankong
(74) *Attorney, Agent, or Firm* — Mattingly & Malur, PC

(57) ABSTRACT

Devices unnecessary for deployment are invalidated during the deployment. A method of building a system and a management server for establishing a system according to the present invention have the following configuration. The management server obtains server information from a server connected through a network, refers to the obtained server information to select devices unnecessary for deployment among devices connected to the server, and invalidates the selected devices.

6 Claims, 27 Drawing Sheets

FIG. 5

| | SERVER IDENTIFIER 501 | CPU ARCHITECTURE 502 | UUID 503 | I/O DEVICE 504 | | | | | | | STORAGE 511 | | | POWER STATUS 515 | SERVER MODEL 516 | VIRTUALIZATION LAYER 517 | VIRTUALIZATION TYPE 518 |
| | | | | DEVICE 505 | CONNECTION 506 | WWN 507 | DRIVER 508 | INITIAL VALUE 509 | STATE 510 | | I/F 512 | CAPACITY 513 | I/F 514 | | | | |
| --- | --- | --- | --- | --- | --- | --- | --- | --- | --- | --- | --- | --- | --- | --- | --- | --- | --- |
| 551 | SERVER 1 | IA32 | UUID1 | HBA | BUSINESS | WWN1 | H-Drv1 | VALID | ↓ | | SCSI | 80GB | boot | ON | BLADE SERVER MODEL z OF COMPANY A | PHYSICAL | VIRTUALIZATION MECHANISM a OF COMPANY A |
| | | | | | | WWN2 | H-Drv1 | VALID | ↓ | | | | | | | | |
| | | | | NIC | MANAGEMENT | MAC1 | N-Drv1 | VALID | ↓ | | | | | | | | |
| | | | | | BUSINESS | MAC2 | N-Drv1 | VALID | INVALID | | | | | | | | |
| 552 | SERVER 2 | IA32 | UUID3 | HBA | BUSINESS | WWN3 | H-Drv2 | VALID | ↓ | | SCSI | 80GB | boot | ON | BLADE SERVER MODEL z OF COMPANY A | VIRTUAL SERVER | VIRTUALIZATION MECHANISM a OF COMPANY A |
| | | | | | | WWN4 | H-Drv2 | VALID | INVALID | | SCSI | 80GB | data | | | | |
| | | | | NIC | MANAGEMENT | MAC3 | N-Drv2 | VALID | ↓ | | | | | | | | |
| | | | | | BUSINESS | MAC4 | N-Drv2 | VALID | INVALID | | | | | | | | |
| 553 | SERVER 3 | IA32 | UUID4 | HBA | BUSINESS | WWN5 | H-Drv3 | VALID | ↓ | | SCSI | 80GB | boot | ON | BLADE SERVER MODEL z OF COMPANY A | VIRTUAL SERVER | VIRTUALIZATION MECHANISM a OF COMPANY A |
| | | | | NIC | MANAGEMENT | MAC5 | N-Drv3 | VALID | ↓ | | | | | | | | |
| | | | | | BUSINESS | MAC6 | N-Drv3 | VALID | INVALID | | | | | | | | |
| | | | | | | MAC6 | N-Drv3 | VALID | INVALID | | | | | | | | |
| 554 | SERVER 4 | IA64 | UUID5 | HBA | BUSINESS | WWN6 | H-Drv4 | VALID | ↓ | | SCSI | 80GB | boot | ON | BLADE SERVER MODEL z OF COMPANY A | VIRTUAL SERVER | VIRTUALIZATION MECHANISM a OF COMPANY A |
| | | | | NIC | MANAGEMENT | MAC6 | N-Drv4 | VALID | ↓ | | | | | | | | |
| | | | | | BUSINESS | MAC7 | N-Drv4 | VALID | ↓ | | | | | | | | |
| | | | | | | MAC7 | N-Drv4 | INVALID | INVALID | | | | | | | | |
| 555 | SERVER 5 | IA32 | UUID6 | HBA | BUSINESS | WWN7 | H-Drv5 | VALID | ↓ | | SCSI | 80GB | boot | ON | BLADE SERVER MODEL x OF COMPANY B | PHYSICAL | --- |
| | | | | NIC | MANAGEMENT | MAC8 | N-Drv5 | VALID | ↓ | | | | | | | | |
| | | | | | BUSINESS | MAC9 | N-Drv5 | VALID | ↓ | | | | | | | | |
| | | | | | | MAC9 | N-Drv5 | INVALID | ↓ | | | | | | | | |
| 556 | SERVER 6 | IA32 | UUID7 | HBA | MANAGEMENT | MAC10 | N-Drv6 | VALID | ↓ | | iSCSI | 80GB | boot | ON | BLADE SERVER MODEL x OF COMPANY B | PHYSICAL | VIRTUALIZATION MECHANISM c OF COMPANY C |
| | | | | NIC | BUSINESS | MAC11 | N-Drv6 | VALID | ↓ | | iSCSI | 80GB | data | | | | |
| | | | | | | MAC11 | N-Drv6 | VALID | ↓ | | IDE | 80GB | boot | | | | |
| 557 | SERVER 7 | IA32 | UUID9 | HBA | MANAGEMENT | MAC12 | N-Drv7 | VALID | ↓ | | | | | ON | BLADE SERVER MODEL x OF COMPANY B | VIRTUAL SERVER | VIRTUALIZATION MECHANISM c OF COMPANY C |
| | | | | NIC | BUSINESS | MAC13 | N-Drv7 | VALID | ↓ | | | | | | | | |
| | | | | | | MAC13 | N-Drv7 | VALID | ↓ | | | | | | | | |
| | ... | ... | ... | ... | ... | ... | ... | ... | ... | | ... | ... | ... | ... | ... | ... | ... |

FIG. 6

| | | | | | | | IP INFORMATION | | P.P INFORMATION | | | |
|---|---|---|---|---|---|---|---|---|---|---|---|---|
| SERVER IDEN-TIFIER | BUSINESS IDEN-TIFIER | DISC IMAGE NAME | OS TYPE | ARCHI-TECTURE | HOST NAME | ID/ PASSWORD | IP ADDRESS | CONNECTION | NAME | UNIQUE SETUP | NECESSARY/ UNNECESSARY | SETUP | MANAGING MEANS |
| SERVER 1 | ... | ... | ... | ... | ... | ... | IP001 | MANAGEMENT | ... | ... | ... | ... | STANDARD INTERFACE |
| | | | | | | | IP002 | BUSINESS | | | | | |
| SERVER 2 | BUSINESS A-1 | DISC IMAGE 11 | Win 2003 | IA32 | Host11 | id11 pw11 | IP111 | MANAGEMENT | APPLICATION A | LOGICAL IP ADDRESS PORT NUMBER | NECESSARY | DONE | DISTRIBUTED PROGRAM 1 |
| | | | | | | | IP112 | BUSINESS | | | | | |
| SERVER 3 | BUSINESS A-2 | DISC IMAGE 21 | Win 2003 | IA32 | Host21 | id21 pw21 | IP211 | MANAGEMENT | APPLICATION A | LOGICAL IP ADDRESS PORT NUMBER | NECESSARY | DONE | DISTRIBUTED PROGRAM 2 |
| | | | | | | | IP212 | BUSINESS | | | | | |
| | | | | | | | IP213 | BUSINESS | | | | | |
| SERVER 4 | BUSINESS B-1 | DISC IMAGE 31 | Linux 2.6.2 | IA64 | Host31 | id31 pw31 | IP311 | MANAGEMENT | APPLICATION B | NON-CLUSTER SYSTEM PORT NUMBER | UNNECESSARY | ... | DISTRIBUTED PROGRAM 2 |
| | | | | | | | IP312 | BUSINESS | | | | | |
| | | | | | | | IP313 | BUSINESS | | | | | |
| SERVER 5 | BUSINESS A-1 | DISC IMAGE 41 | Win 2003 | IA32 | Host41 | id41 pw41 | IP411 | MANAGEMENT | APPLICATION A | LOGICAL IP ADDRESS PORT NUMBER NIC TEAMING | NECESSARY | UNDONE | STANDARD INTERFACE |
| | | | | | | | IP412 | BUSINESS | | | | | |
| | | | | | | | IP413 | BUSINESS | | | | | |
| SERVER 6 | ... | ... | ... | IA32 | ... | ... | IP501 | MANAGEMENT | ... | | | ... | STANDARD INTERFACE |
| | | | | | | | IP502 | BUSINESS | | | | | |
| | | | | | | | IP503 | BUSINESS | | | | | |
| SERVER 7 | BUSINESS A-1 | DISC IMAGE 61 | Win 2003 | IA32 | Host61 | id61 pw61 | IP611 | MANAGEMENT | APPLICATION C | LOGICAL IP ADDRESS PORT NUMBER | LOGICAL IP ADDRESS NECESSARY | UNDONE | DISTRIBUTED PROGRAM 3 |
| | | | | | | | IP612 | BUSINESS | | | | | |
| | | | | | | | IP612 | BUSINESS | | | | | |
| ... | | | | | | | ... | | ... | | | | |

OS SETUP PARAMETER / PARAMETER OTHER THAN OS SETUP PARAMETER

FIG.7

| | ALERT IDENTIFIER (701) | CONTENT OF ALERT (702) | START TIME (703) | END TIME (704) |
|---|---|---|---|---|
| 751 | ALERT 1 | INSERT BLADE SERVER | TIME 1 | TIME 1 |
| 752 | ALERT 2 | REMOVE BLADE SERVER | --- | --- |
| 753 | ALERT 3 | DETECT NEW SERVER | TIME 1 | TIME 1 |
| 754 | ALERT 4 | REQUEST DEPLOYMENT | TIME 2 | TIME 2 |
| 755 | ALERT 5 | NOTIFY OS ACTIVATION | --- | --- |
| 756 | ALERT 6 | REQUEST DEVICE VALIDATION | TIME 3 | TIME 3 |
| 757 | ALERT 7 | TIME 1 INITIATION REQUEST | TIME 1 | TIME 3 |
| 758 | ALERT 8 | TIME 2 INITIATION REQUEST | TIME 2 | TIME 3 |
| 759 | ALERT 9 | TIME 3 INITIATION REQUEST | TIME 3 | TIME 3 |
| | : | : | : | : |

METHOD OF BUILDING SYSTEM AND MANAGEMENT SERVER

INCORPORATION BY REFERENCE

This application claims priority based on a Japanese patent application, No. 2008-280313 filed on Oct. 30, 2008, the entire contents of which are incorporated herein by reference.

BACKGROUND OF THE INVENTION

1. Field of the Invention

The present invention relates to a method of building a system and a management server for building a system that are accompanied with a deployment.

2. Description of the Related Art

In recent years, blade servers have been introduced to implement additional space. Upon introduction of the blade servers, in most cases, users keep some slots in a chassis empty without fully filling the chassis with blade servers. According to the development of the users' business, blade servers are added or inserted into the empty slots when additional blade servers are required. At this time, the blade servers that have been introduced are already under operation, and connected to a network for business in order to execute business.

JP-A-2007-148714 discloses a technology where an OS (Operating System) is installed on a system having plural connection paths each having redundancy in a case where some blade servers are added, the connection paths are virtually blocked by using a device driver so that a single path remains.

As described above, in a case where a blade server is newly added to a blade server which is under actual operation, there is a possibility that the newly added blade server quickly comes to be connected to a network for business under operation due to the physical features of the blade server (e.g. a device of the added blade server, such as a network interface, may be operated as soon as the blade server is set in the chassis). This possibility is not limited to when a blade server is newly added and may take place anytime when deployment is necessary to perform in the blade server. This possibility is prominent when a blade server is newly added. casein such a case, packets are transmitted to blade servers other than the blade servers under actual operation or the setup may be duplicated, so that there is a likelihood of impeding the execution of business under actual operation or allowing for invasion of malicious users by accessing the business network without the security setup being complete.

Accordingly, there is a need for a capability of invalidating devices unnecessary for deployment during the deployment.

Unlike this, the technology disclosed in JPA-2007-148714 is to make either one of the paths with redundancy left, and is not directed to selectively leaving a path that may be used for the deployment.

SUMMARY OF THE INVENTION

A method of building a system and a management server used for building a system according to the embodiments of the present invention have the following configurations.

The management server obtains server information from a server connected via a network, refers to the obtained server information, selects some of the devices connected to the server unnecessary for deployment, and invalidates the selected devices.

According to another aspect of the present invention, the device is an NIC (Network Interface Card).

According to still another aspect of the present invention, the device unnecessary for deployment is a device other than devices for connecting to the management server through the network.

According to yet still another aspect of the present invention, the server is a virtual server constructed onto a physical server, and the device unnecessary for deployment is a virtual device except for a NIC included in the virtual server for connecting to the management server through the network. Invalidation means releasing a corresponding part between the virtual device other than the virtual NIC and the physical device included in the physical server.

The present invention may invalidate devices unnecessary for deployment during deployment.

BRIEF DESCRIPTION OF THE DRAWINGS

FIG. 5 is a view illustrating a server management table;

FIG. 6 is a view illustrating a table regarding logic information of a server;

FIG. 7 is view illustrating an alert management table;

DETAILED DESCRIPTION OF THE PREFERRED EMBODIMENTS

There are invalidated devices other than a device (network interface) communicating with a management server and a device (disc interface) connected to a storage device which is subjected to deployment, that is, devices which are not used for the deployment.

Deployment to a blade server with management server means constructing a promptly executable OS, which is called an "image of OS" where setup information unique to the blade server which is subjected to deployment has been set up with a basic OS. The basic OS and the setup information unique to the blade server subjected to the deployment are stored in a storage device (disc device) connected to the management server. The management server sends the basic OS and the setup information unique to the blade server subjected to the deployment via a network. The blade server subjected to the deployment stores the sent OS image in the storage device connected thereto. If the management server has such a configuration as to be capable of accessing the storage device storing the OS image of the blade server subjected to the deployment, the management server may directly store the OS image into the storage device without passing through the blade server subjected to the deployment.

In addition, the management server may not sometimes recognize the setup location (arranging method of information or storing address in the OS) of the setup information unique to the blade server subjected to the deployment because it depends on the type of OS. For this case, the management server loads the basic OS onto the blade server subjected to the deployment through the network to run a setup program to obtain unique setup information, which is included in the OS. According to the operation of the setup program, the management server transmits the unique setup information to the blade server subjected to the deployment via the network so that an OS image may be constructed on the blade server subjected to the deployment. The blade server subjected to the deployment stores the constructed OS image into a prescribed storage device.

The OS image is not limited to an OS and may be any image including an application program (business program). For this case, the OS image may provide predetermined work promptly upon being loaded on the blade server subjected to the deployment and starting its operation.

First Embodiment

Figure 1:
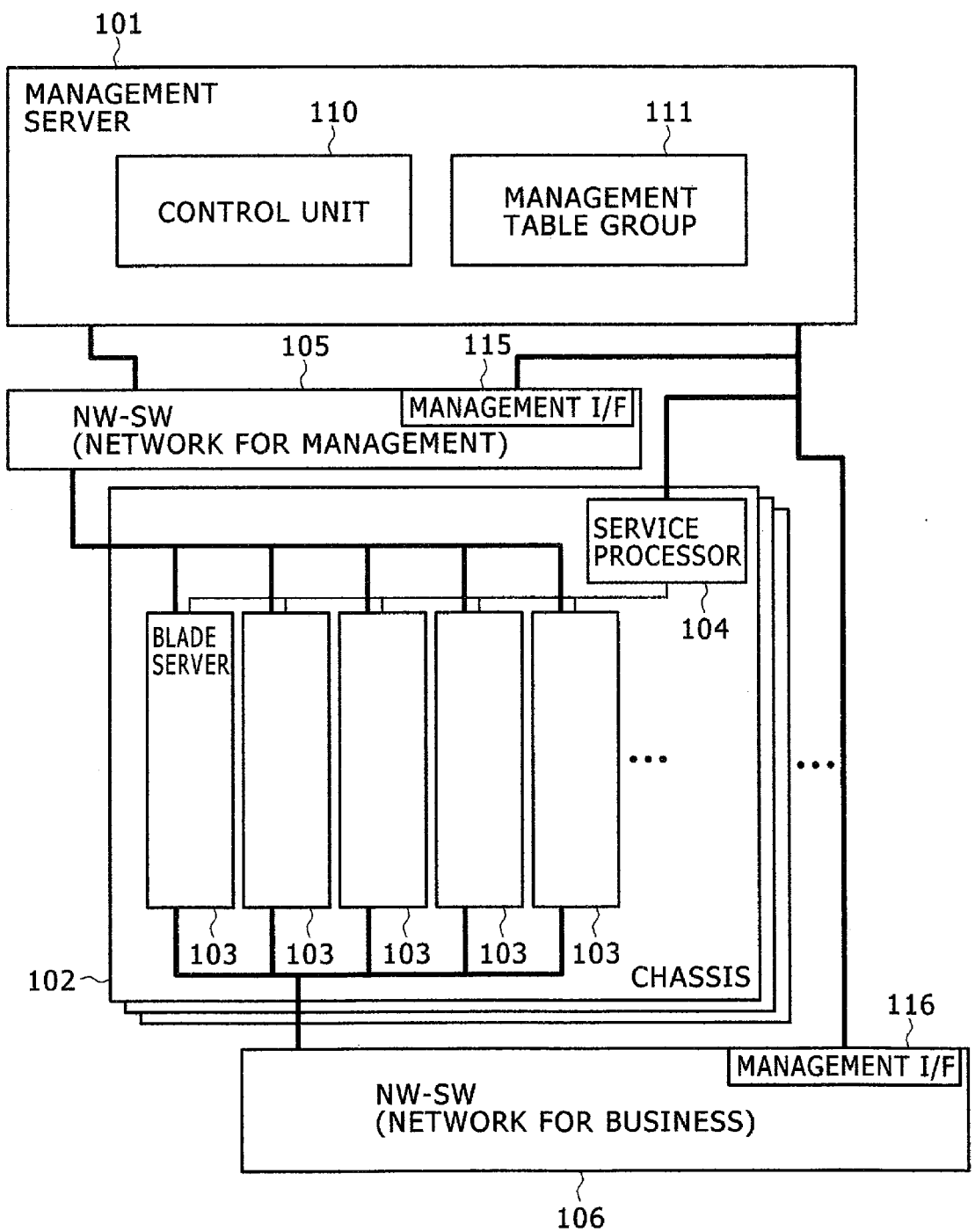
FIG. 1 is a view illustrating a configuration of a system according to a first embodiment.

FIG. 1 shows a configuration of a system according to a first embodiment. A management server 101 is connected to a service processor 104 and a blade server 103 of a chassis 102 through an NW-SW (network for management) 105. The service processor 104 is connected to the blade server 103 through an internal network. The management server 101 is connected to a management interface (management I/F) 115 of the NW-SW 105 and a management interface 116 of an NW-SW (network for business) 106 so that the management server 101 may set up VLAN (Virtual LAN) of each NW-SW.

The service processor 104 detects the addition/removal of the blade server 103 (addition or removal of the blade server 103) to/from the chassis 102 and notifies the management server 101. The management server 101 recognizes that another blade server 103 is newly added and it is the blade server 103 subjected to deployment due to the notification.

The NW-SW 105, which is a network for management, is a network necessary to perform operation and management of the blade server 103, such as transmission of OS or applications, or power control. The NW-SW 106 is a network for business and this is used by applications for business that are executed on the blade server 103.

A control unit 110 is executed on the management server 101 to refer to and update a management table group 111.

Figure 2:
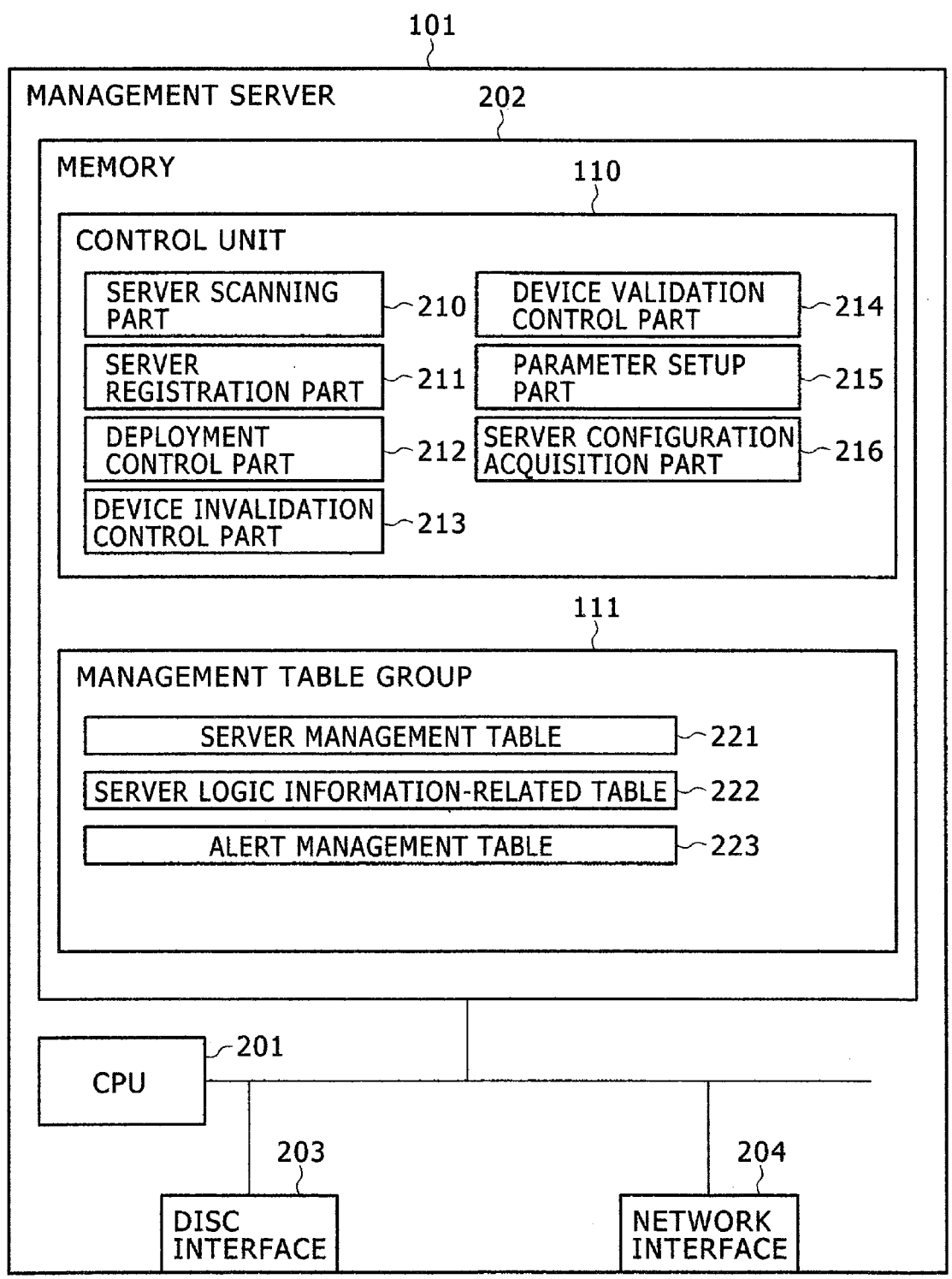
FIG. 2 is a view illustrating a configuration of a management server.

FIG. 2 shows a configuration of the management server 101. The management server 101 includes a CPU (Central Processing Unit) 201 that processes the operation, a memory 202 that stores a program operated by the CPU 201 or data coming as a result of execution of the program, a disc interface 203 that interfaces with the storage device storing the program or data, and a network interface 204 for communication over an IP network.

Even though a single network interface 204 and a single disc interface 203 are representatively shown in FIG. 2, they may be provided plurally. For example, different network interfaces 204 are used for connecting the network 105 for management and the network 106 for business.

The control unit 110 and the management table group 111 are contained in the memory 202. The control unit 110 includes a server scanning part 210 (see FIG. 10), a server registration part 211 (see FIG. 11), a deployment control part 212 (see FIG. 13), a device invalidation control part 213 (see FIG. 14), a device validation control part 214 (see FIG. 15), a parameter setup part 215 (see FIG. 16), and a server configuration acquisition part 216 (see FIG. 12). The management table group 111 includes a server management table 221 (see FIG. 5), a server logic information-related table 222 (see FIG. 6), and an alert management table 223 (see FIG. 7).

Figure 3:
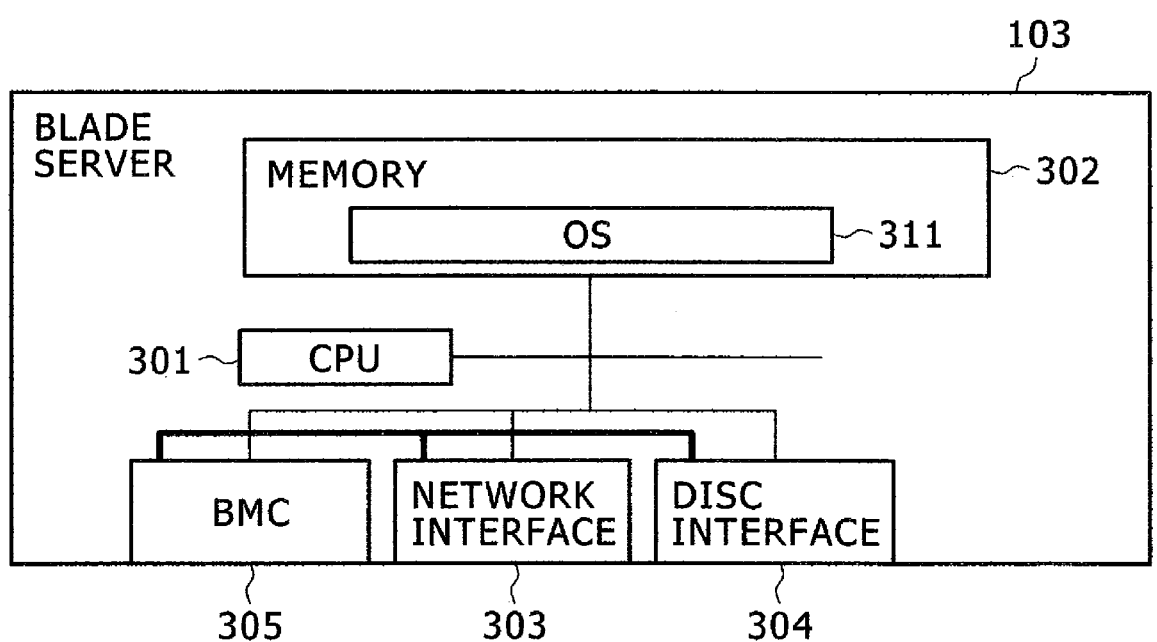
FIG. 3 is a view illustrating a configuration of a blade server.

FIG. 3 shows a configuration of the blade server 103. The blade server 103 includes a CPU 301 that processes the operation, a memory 302 that stores a program operated by the CPU 301 or data coming as a result of execution of the program, a disc interface 304 that interfaces with the storage device storing the program or data, a network interface 303 that performs communication over an IP network, and a BMC (Basement Management Controller) 305 that performs power control or control of each interface. The OS 311 on the memory 302 is executed by the CPU 301 to manage the device in the blade server 103. Applications for providing a business are operated under the OS 311.

Even though a single network interface 303 and a single disc interface 304 are representatively shown in FIG. 3, they may be provided plurally. For example, different network interfaces 303 are used for connecting the network 105 for management and the network 106 for business. As described above, upon execution of deployment, the network interface 303 is necessary for connecting to the management server 101 through the network 105 for management but connection to the network 106 for business and the network interface 303 are unnecessary.

With respect to the disc interface 304, different disc interfaces 304 are used as disc storage for an OS image constructed as a result of executing of deployment and disc storage for a database used for executing applications, respectively. The newly added blade server 103, on which the OS image has been constructed, may gain access to the disc used for storing a database by another blade server to perform actual work until the actual operation is initiated, but may cause malfunction of the database. Subsequently, the disc interface 304 for storing the OS image may be operated during the execution of the deployment, while the disc interface 304 is not used as the interface for disc storage of the database used for execution of applications.

As seen from the newly added blade server 103, the network interface 303 connects the management server 101 and the disc interface 304 that are connected to the disc storing the OS image which is devices necessary for deployment, while the other devices become unnecessary. Thus, in order to avoid any possible malfunctions during deployment, unnecessary devices are invalidated.

Figure 4:
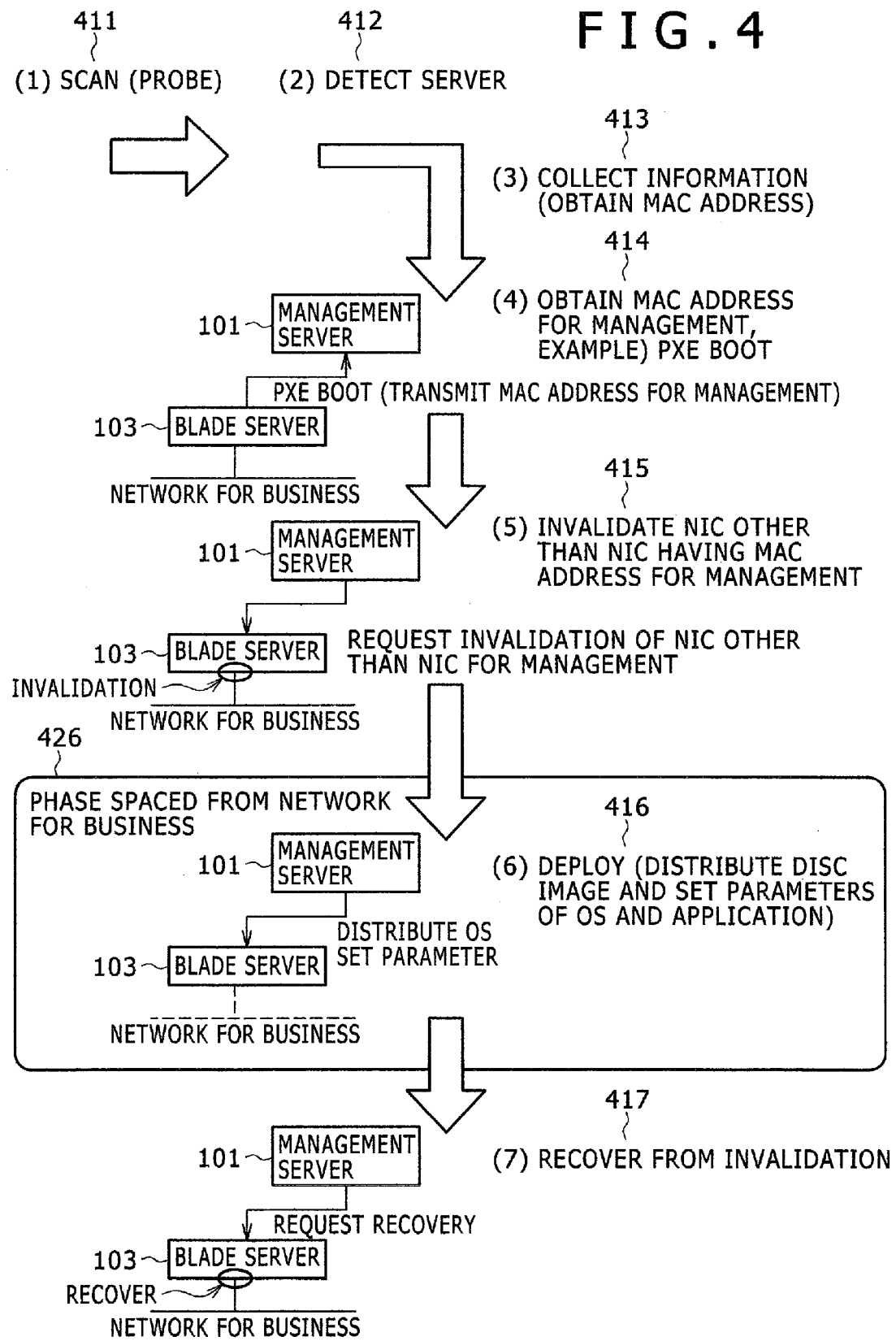
FIG. 4 is a view schematically illustrating an operation of a method of building a system.

FIG. 4 schematically shows an operation of a method of building a system. (1) The server is scanned (probed) at the time of regular surveillance or an event (411) and (2) the blade server 103 are detected (412). (3) Information is collected for the detected blade server 103 (413). Although information may be collected by an information collection program, or the information may be collected by an OS standard interface or standardized protocols.

Thereafter, (4) the MAC (Media Access Control) address of an NIC (Network Interface card) connected to the management server is obtained (414). For example, the MAC address of the NIC connected to the management server may be collected by PXE (Pre-boot Execution Environment) booting the blade server 103 and obtaining the broadcast MAC address. Further, it is also possible to collect the location information or MAC address of the targeted blade server 103 from the service processor 104 connected to the management network to which the blade server 103 and the management server 101 are jointly connected. As a method of obtaining the MAC address of the NIC connected to the management server 101 from a list containing MAC addresses, there are a method saying "PXE booting is performed from the network interface 303 of the blade server 103 connected to the network for management to collect the broadcast MAC address" or a method saying "PXE booting is performed from the NIC 303 of the blade server 103 connected to the network for management, an information collection program is executed on the OS (Operating System) that is transferred to the blade server 103 to obtain the MAC address. The NICs 303 owned by the blade server 103 are invalidated once and then validated one by one, and a ping process is performed to the management server 101 so as to obtain the MAC address of the NIC 303 that is valid upon any reaction." (5) NICs 303 other than the NIC 303 connected to the network for management is validated. This is why the NIC 303 connected to the management server 101 is used for deployment whereas the others that are connected to the network for business need to be isolated from the deployment period. (6) Deployment is performed. Specifically, a disc image is transferred to the blade server 103 to set parameters of an OS or applications. In this case, since the NIC 303 is invalidated as described in (5), the blade server 103 is logically isolated from the network for business and the blade server 103 being setup is connected to the network for business, so that it is prevented to transmit packets to blade servers 103 other than to ones that provide actual work or allow for invasion of malicious users by accessing the network for business without the security setup being complete.

Thereafter, (7) the invalidated NIC 303 of the blade server 103 is recovered. At this time, it is possible to set the parameters that could not be set since the device was being invalidated.

If the system is built according to the above operations, such a problem may be avoided when the blade server 103 to be added is connected to the network for business that is used for actual business, without being completely tested or set.

FIG. 5 shows the server management table 221. A column 501 represents a server identifier by which each server may be identified in a unique manner. Data stored in column 501 may be omitted to enter by designating any one or a combined one of the plural columns used for the table. Or, the data may be automatically allocated, for example, in an ascending order.

CPU architecture is stored in column 502. The CPU architecture is useful information in determining the type of disc image to be deployed. A disc image for a different CPU architecture distributed may not be executed in the blade server 103. The CPU architecture is information useful to prevent wrong transmission.

A UUID (Universal Unique Identifier) is stored in column 503. The UUID is an identifier whose format is predefined not to be duplicated. Accordingly, the UUID is used as an identifier to clearly guarantee uniqueness by retaining the UUID corresponding to each server, and thus is a candidate of the server identifier stored in column 501. The UUID is very effective for managing servers that are widely distributed. Since this type of identifier is such that a server can be identified by the system manager to be used for column 501 and there is no possibility of repetition between servers subjected to management, however, it is not necessary to use the UUID. For example, host name, IP address, MAC address, WWN (World Wide Name), and the like may be used as the server identifier of column 501.

Information on an I/O device is stored in column 504 (column 505 to column 510). The type of device is stored in column 505. HBA (Host Bus Adaptor) or NIC may be stored in column 505.

The type of network at a connection destination is stored in column 506. For instance, a network for management or network for business is stored in column 506. It is determined which device should be invalidated from the information. For NIC, the device to be invalidated is the one connected to a network for business unnecessary for deployment. For HBA, information is received from the manager so that the HBA invalidated is the one connected to a storage which is not preferred during deployment in order to isolate the storage to prevent data. The storage for booting is a region which stores the disc image upon deployment, and thus this is not subjected to invalidation. However, it is also possible to invalidate the HBA connected to the storage for booting in order to prevent erroneous distribution; for example, it is possible to prevent the deployment from being carried out on an adjacent blade server 103.

WWN owned by the HBA or MAC address owned by the NIC is stored in column 507. The WWN becomes an identifier for identifying the server side in an SAN environment. Accordingly, the SAN environment sometimes functions as a server identifier for the entire system. The MAC address sometimes plays a role as a server identifier because it is generally a unique identifier as itself. The MAC address becomes an identifier that identifies the server side in the case of having an iSCSI-connected storage.

The type of device driver included in the I/O device is stored in column 508. It is important to know which device driver is included as a device in accordance with the quality of compatibility to prevent the system from shutting down. An initial value regarding validity or invalidity of the device is stored in column 509. This allows for determining whether a device needs to be validated because it is a device that experienced invalidation or should not be validated because it is an originally invalidated device upon performing validation. The current state regarding validity or invalidity of a device is stored in column 510. It is possible to determine whether the device is subjected to recovery or not by combining it with the column 509.

Information in storage is stored in column 511 (column 512 to column 514). Information on a connection I/F (interface) between a server and a storage device is stored in column 512. When any interface through which the disc image is obtained means that an order of driver change is needed in a case where the disc image is transferred to the blade server 103 having another interface.

The storage capacity of a storage device is stored in column 513. If the storage capacity is small, it may fail to secure large data regions used by a program that is executed on the blade server 103 by the user. Therefore, this case requires as light operation as possible. On the contrary, in a case where the storage capacity is large and a large number of blade servers are managed, data for management becomes larger and this enables high-reliability systems to be configured in terms of information searching or information accumulation. Further, since it is impossible to transfer the disc image to a blade server 103 whose storage capacity is below the data size of the disc image, this column 513 is used for recognizing such a blade server 103.

Information on whether a storage device is one for booting an OS (OS activation, OS boot) or for storing data is stored in column 514. It may be considered that an initial setup value for column 514 is set as "boot" and operated without change; however, the initial setup value is generally entered by the manager manually. In cooperation with column 506, column 514 stores "management" into column 506 in the case of a storage device for booting and "business" in the case of a storage device for data, so as to correctly correspond to device invalidation that is described in column 506.

The power status is stored in column 515. The power status indicates activation or inactivation of a server, and thus a command needs to be additively provided to turn on the power in a case where the power has been OFF upon deployment.

A server model is stored in column 516. A vendor name or model name is stored in column 516, and this makes it possible to determine whether the server model may deploy the disc image or not. It is also possible to determine whether or not to correspond invalidating a device. For instance, it may be possible to determine whether or not the specific device exemplified in the third embodiment to be described later is mounted on the corresponding server.

A virtualization layer is stored in column 517. Physical, virtualization mechanism and a virtual server are existent in the virtualization layer. This enables determining which layer of server virtualization technologies each server is positioned as well as selecting a method of invalidating a device based on such server virtualization technology, as to be described in the fourth embodiment below.

The type of virtualization is stored in column 518. The vendor name of a vendor offering a virtualization product or product name is stored in column 518. This is necessary for obtaining information such as the interface or obtaining protocol and whether to correspond to a model such as CIM or not. The information stored in column 518 is necessary to select a method of invalidating a device as described in column 517.

FIG. 6 shows table 222 regarding logic information of a server. Column 601 stores a server identifier by which each server is identified in a unique manner.

Column 602 stores a business identifier. This business identifier includes a description method of specifying each server of business A, such as a first server and a second server, up to a server level, a description method of specifying a business level by representing installation of software that became common as business A, and a description method of specifying a common environment level by representing installation of software which as become the common system.

A column 603 stores the name of a disc image. The disc image name is an identifier that specifies each disc image. This identifies the disc image of a server and thus may be considered to be nearly the same as a business. However, there exists a disc image or OS on which no applications are installed, or a disc image on which an application is installed but not set up, and transmission thereof may facilitate to add some servers that perform business recovery or provide businesses.

Column 604 stores the type of OS. This enables determining whether or not a security measure is the most updated by including a SP (Service Pack) or patch information. Further, in light of maintenance, an advantage is that maintenance of a server may be simply conducted by using the information of the blade server 103. Even though a specific OS is described in the table, descriptions on other OSs may be similarly obtained, and desired effects of the present invention may be achieved.

Column 605 stores a CPU architecture to which an OS corresponds. It is possible to avoid erroneous distribution by determining whether or not the OS is transmitted to its corresponding blade server upon transmission of the OS. This also applies to ones other than the specific CPU architecture described in the table.

Column 606 stores a host name. The host name is set as OS setup upon deployment. The host name is information used at this time. Column 607 stores the password of an OS. The password is set as OS setup upon deployment as in column 606. The password is information used at this time.

Column 608 (column 609 to column 610) stores IP information. Examples of IP information to be stored in column 609 include an IP address, a subnet mask, a default gateway, and the like. The IP information is set as OS setup upon deployment. The IP information is information used at this time. Besides, server scanning may be done by designating the range of the IP address by operational policy of a data center. The IP address may sometimes become an identifier that identifies a server depending on a manager or application. Column 610 stores the type of network at a connection destination. The parameter setup of an OS may be done upon deployment by making the IP information different, which is desired to be allocated onto an NIC belonging to the network for management and IP information which is desired to be allocated onto an NIC belonging to the network for business.

Column 611 (column 612 to column 616) stores information on P.P. (Program/Product). Column 612 stores the name of the P.P. This column stores information on middleware or application and its respective version that is necessary to provide a business.

Column 613 stores unique information of the P.P. This includes each P.P. and used IP address (logical IP address) or port number. The repetitive port number may cause software not to be operated or gives rise to malfunctions of the P.P. that runs the business. These problems may be avoided by collecting information on each P.P. and used values for normal operations and avoidance of repetition. For example, this corresponds to a limitation to an operational environment such as JRE (Java Runtime Environment) (Java is a registered trademark).

Column 614 stores information on whether it is necessary or not necessary of setup for each and every P.P. It is needed to perform a recovery process of a device after the completion of setup so as to prevent information owned by an application from being repeated with another application that operates on another blade server upon deployment. Column 615 stores information on whether completion or non-completion of setup for each and every P.P. The completion or non-completion of setup is managed in order to prevent setup information from being repeated with an application that is provided to another blade server like in column 614.

Column 616 stores management means. A standard interface of an OS or a standardized interface may be used as a method of collecting information or managing a blade server. The column 616 stores a management model or a communication protocol.

FIG. 7 shows an alert management table 223. A notification is sent from the service processor 104 or the blade server 103. Although not shown, there are notified commands or instructions by a user from an input/output device that is connected to the management server 101, and these commands or instructions are gathered to be managed by the alert management table 223.

Column 701 stores an alert identifier. Column 702 stores the content of an alert. Column 703 stores the type of alert, which is a policy of collecting information or conducting deployment upon insertion of a blade server.

Column 703 also stores the time when an alert is initiated (starting time). The times may be separated into three times: the first is a time when a blade server is inserted into the chassis or time when a blade server is newly discovered; the second is a request of deployment initialization; and the third is a request of recovering (validating) an invalidated device. It may be determined with each alert which action will be initiated.

Column 704 stores the time when an alert completes its action. If there is an alert that starts at time 1 and ends without entering time 2, there also exists an alert that lasts until the completion of time 3.

Figure 8:
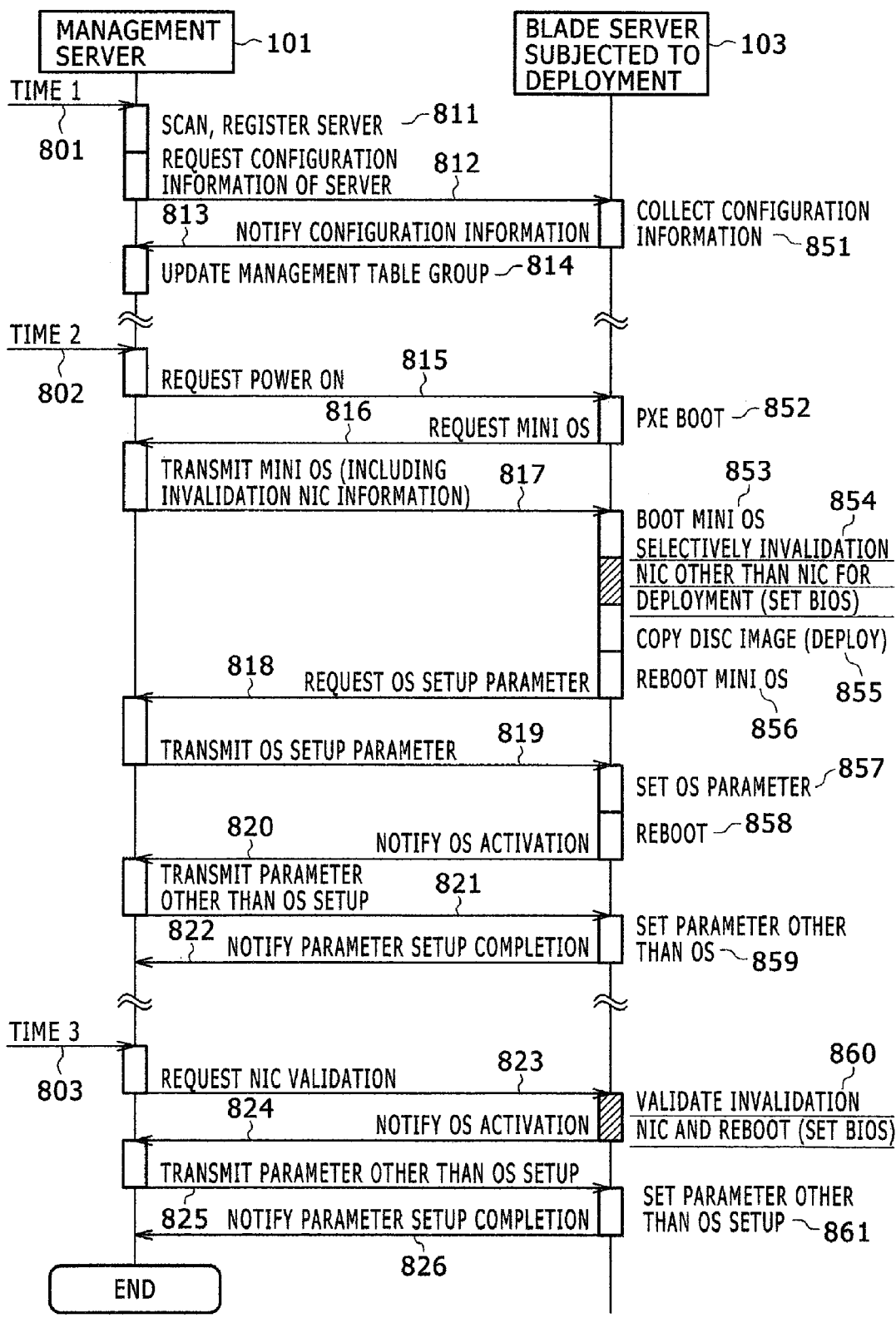
FIG. 8 is a view illustrating an operation sequence according to the first embodiment.

FIG. 8 is a view illustrating an operation sequence of the management server 101 and the blade server 103 subjected to deployment. An alert is notified to the management server 101 at time 1 in step 801. The management server 101 scans the blade server 103 for server registration in step S811. The management server 101 demands the configuration information of the blade server 103 from the blade server 103 subjected to deployment in step 812.

The blade server 103 subjected to deployment collects its own configuration information in step 851. The blade server 103 subjected to deployment notifies the configuration information to the management server 101 in step 813. The management server 101 updates the management table group 111 in step 814.

An alert at time 2 is notified to the management server 101 in step 802. However, step 802 may be dropped depending on the type of alert so that the steps subsequent to the step at time 2 proceed or the process ends in step 814.

The management server 101 requests the blade server 103 subjected to deployment to power on in step 815. The blade server 103 subjected to deployment powers on to the initiate PXE boot in step 852.

The blade server 103 subjected to deployment demands a mini OS (OS which is transmitted to the blade server 103 subjected to deployment upon PXE boot and manages MAC addresses or IP addresses to execute boot control using a network) from the management server 101 in step 816. The management server 101 sends the mini OS to the blade server 103 subjected to deployment in step 817. At this time, information on a device to be invalidated is transmitted, too. The information on the device to be invalidated may be obtained by the mini OS when the mini OS performs communication with the management server 101 after its booted, as well as may be transmitted along with the mini OS.

The blade server 103 subjected to deployment boots the mini OS in step 853. The blade server 103 subjected to deployment sets the BIOS in such a manner to selectively invalidate devices that are not involved in the deployment in step 854. The BIOS is set so that among data managed by the BIOS to control each device, data either represents validity or invalidity of the device is set to represent invalidity.

The mini OS reboots as necessary. Upon reboot, the process proceeds again from step 852. At this time, the management server 101 memorizes how many times the mini OS experienced booting. Or, the management server 101 checks if a device to be invalidated by the mini OS has booted is being invalidated, and if being invalidated, the process goes to the next step. If not being invalidated, the management server 101 invalidates the device and reboots as necessary. This enables the blade server 103 subjected to deployment to be isolated from the network for business while the deployment is carried out.

The blade server 103 subjected to deployment copies a disc image onto a storage device in step 855. The blade server 103 subjected to deployment reboots the mini OS in step 856.

The blade server 103 subjected to deployment requests an OS setup parameter in step 818. The management server 101 transmits the OS setup parameter to the blade server 103 subjected to deployment in step 819. The blade server 103 subjected to deployment sets the OS parameter in step 857. The blade server 103 subjected to deployment executes rebooting in step 858. The blade server 103 subjected to deployment transmits an OS activation notification to the management server 101 in step 820.

The management server 101 transmits parameters other than the OS setup parameter to the blade server 103 subjected to deployment in step 821. The blade server 103 subjected to deployment sets the parameters other than the OS setup parameter in step 859. The blade server 103 subjected to deployment transmits a notification on setup completion of the parameters other than the OS setup parameter to the management server 101 in step 822.

An alert is notified to the management server 101 at time 3 in step 803. However, step 803 may be dropped depending on the type of alert so that the process proceeds to the steps subsequent to the step at time 3 or ends at step 822.

The management server 101 transmits a validation request of the invalidated device to the blade server 103 subjected to deployment in step 823. The blade server 103 subjected to deployment performs a process of recovering (validating) the invalidated device by the BIOS setup and reboots in step 860. The BIOS setup associated with the validation process is done so that the above mentioned data representing the validity/invalidity of the device represents validity.

The blade server 103 subjected to deployment transmits an OS activation notification to the management server 101 in step 824. The management server 101 transmits parameters other than the OS setup parameter to the blade server 103 subjected to deployment in step 825. The blade server 103 subjected to deployment sets the parameters other than the OS setup parameter in step 861. Parameters that have not been set due to invalidation of the device may be set by step 861. The blade server 103 subjected to deployment notifies completion of setup of the parameters other than the OS setup parameter to the management server 101 in step 826 and completes the process.

Figure 9:
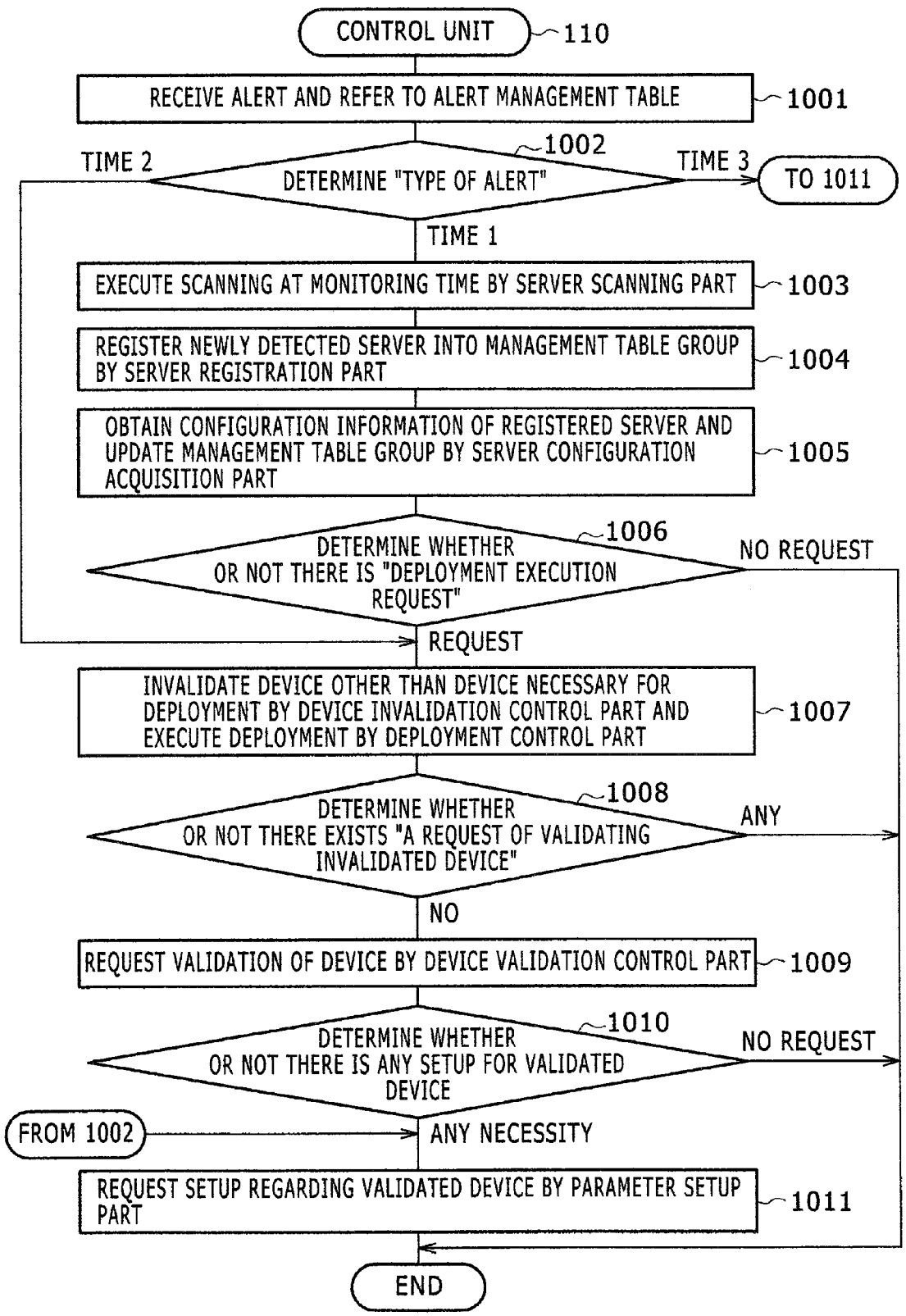
FIG. 9 is a flowchart illustrating a process performed by a control part.

FIG. 9 is a flowchart illustrating a process performed by the control unit 110. An alert is received to refer to the alert management table 223 in step 1001. The type of alert is determined in step 1002. In a case where the type of alert is one at time 1, the process goes to step 1003, in a case where the type of alert is one at time 2, the process goes to step 1007, and in a case where the type of alert is one at time 3, the process goes to step 1011.

The server scanning part 210 executes scanning at a monitoring time in step 1003. The server registration part 211 registers a newly detected blade server 103 with the management table group 111 in step 1004. The server configuration acquisition part 216 obtains configuration information of the registered blade server 103 to update the management table group 111 in step 1005. It is determined whether or not there is any deployment execution request in step 1006. If any, the process goes to step 1008, and otherwise the process ends.

The device invalidation control part 213 invalidates devices other than the device necessary for deployment and the deployment control part 212 executes deployment in step 1007. It is determined whether or not there exists "a request of validating the invalidated device" in step 1008. If any, the process goes to step 1009 and otherwise the process ends.

The device validation control part 214 requests the validation of the device in step 1009. It is determined in step 1010 whether any setup is necessary or unnecessary for the validated device. If necessary, the process goes to step 1011 and otherwise the process ends. The parameter setup part 215 requests setup regarding the validated device in step 1011 and then the process ends.

Figure 10:
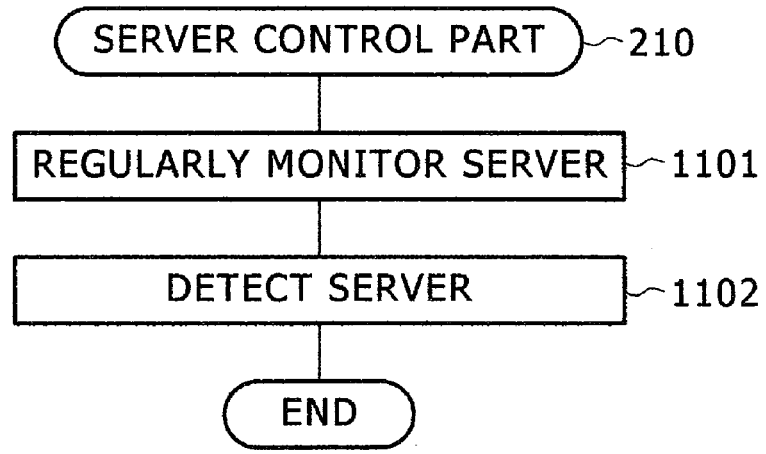
FIG. 10 is a flowchart illustrating a process performed by a server scanning part.

FIG. 10 shows a flowchart illustrating a process performed by the server scanning part 210. A server is regularly monitored in step 1101. A monitoring start time is issued at this step. However, issuance of the monitoring start time may not be done regularly but at a scheduled time. Also, the time may be provided by a user through an alert generated due to inserting the blade server 103 into the chassis 102 or UI (User Interface). The blade server 103 is detected by the existing server scanning method in step 1102 and then the process ends. Specifically, ping packets are transmitted in an area of the stored IP address and a response is received from the server. An IP address from which any response is made is recorded and server detection is done. A connection is tried by designating a host name to the protocol (for example, ssh) that is stored as a scanning method. Since log-in is not necessary to confirm and there exists a server under the state of accepting any access server detection is done. The present invention is not limited to this, and any method is acceptable as long as it may confirm the existence of the server.

Figure 11:
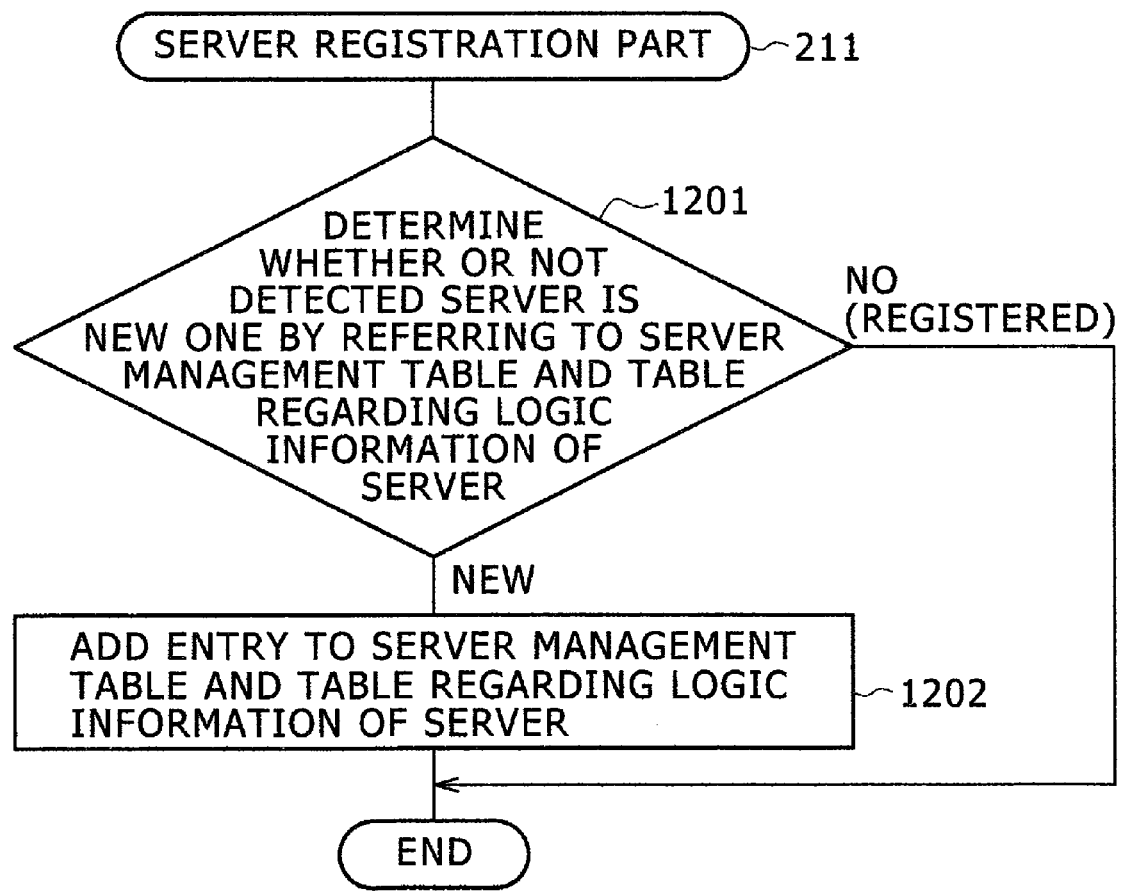
FIG. 11 is a flowchart illustrating a process performed by a server registration part.

FIG. 11 shows a flowchart illustrating a process performed by the server registration part 211. It is determined in step 1201 whether or not the detected server is new by referring to the table 222 regarding logic information of the server and the server management table 221. When the server has been detected in a ping process, the IP address is determined, and thus the IP information of the column 608 in the table 222 regarding the logic information of the server is referred to. If not registered, the server is determined as new and the process goes to step 1202. On the contrary, if registered, the server is not determined as new and the process ends. An entry is added to the table 222 regarding the logic information of the server and the server management table 221 in step 1202 and then the process ends.

Figure 12:
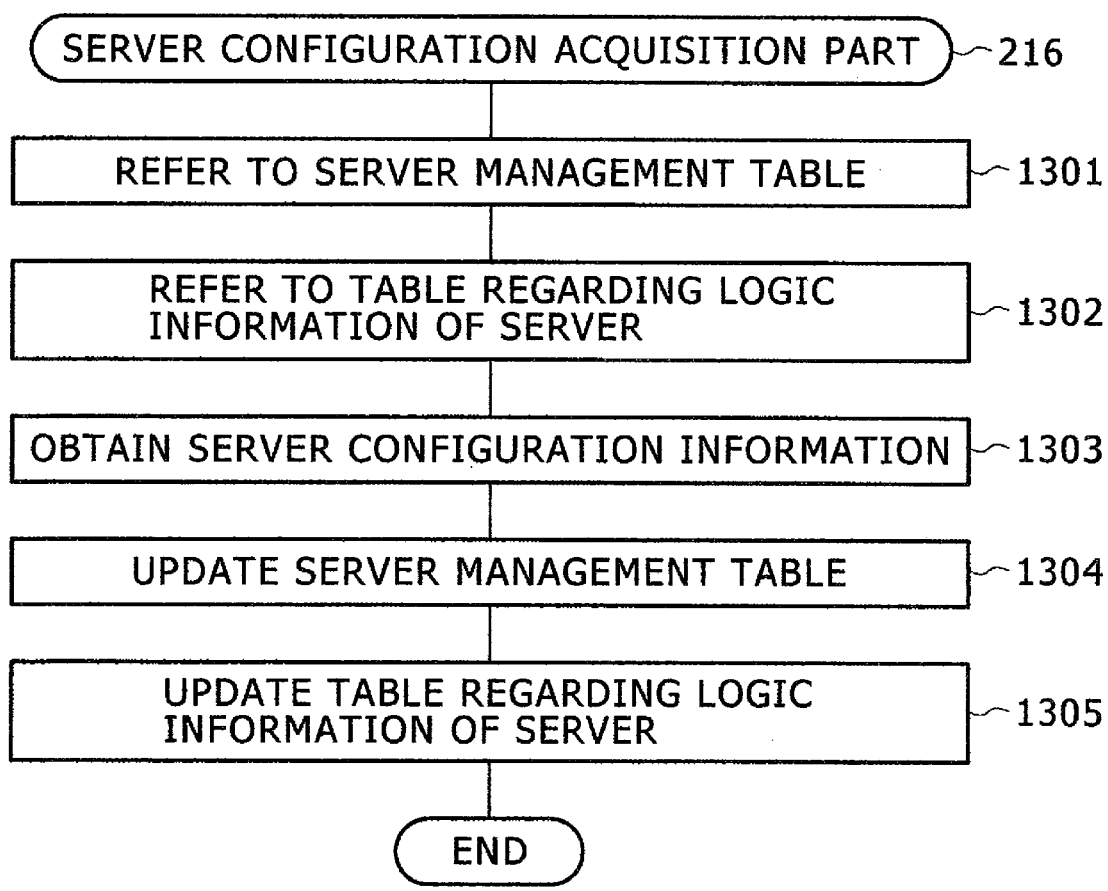
FIG. 12 is a flowchart illustrating a process performed by a server configuration acquisition part.

FIG. 12 shows a flowchart illustrating a process performed by the server configuration acquisition part 216. The server management table 221 is referred to, any new entry is detected, and information whose registration has been completed is read in step 1301. In step 1302, the table 222 regarding the logic information of the server is referred to and registration-completed information is read with respect to the new entry detected in step 1301. Configuration information of the server is obtained in step 1303. Log-in to the server of the new entry is done by using the ID and password information that have been read from the server logic information-related table 222 regarding the logic information on the server using the IP address. Thereafter, information on the server or OS is obtained by using WMI (Windows Management Instrumentation: Windows is a registered trademark). Or, it may be possible to obtain the information through an agent program. In step 1304, the information obtained in step 1303 is stored in the server management table 221. In step 1305, the information obtained in step 1303 is stored in the table 222 regarding the logic information of the server and then the process ends.

Figure 13:
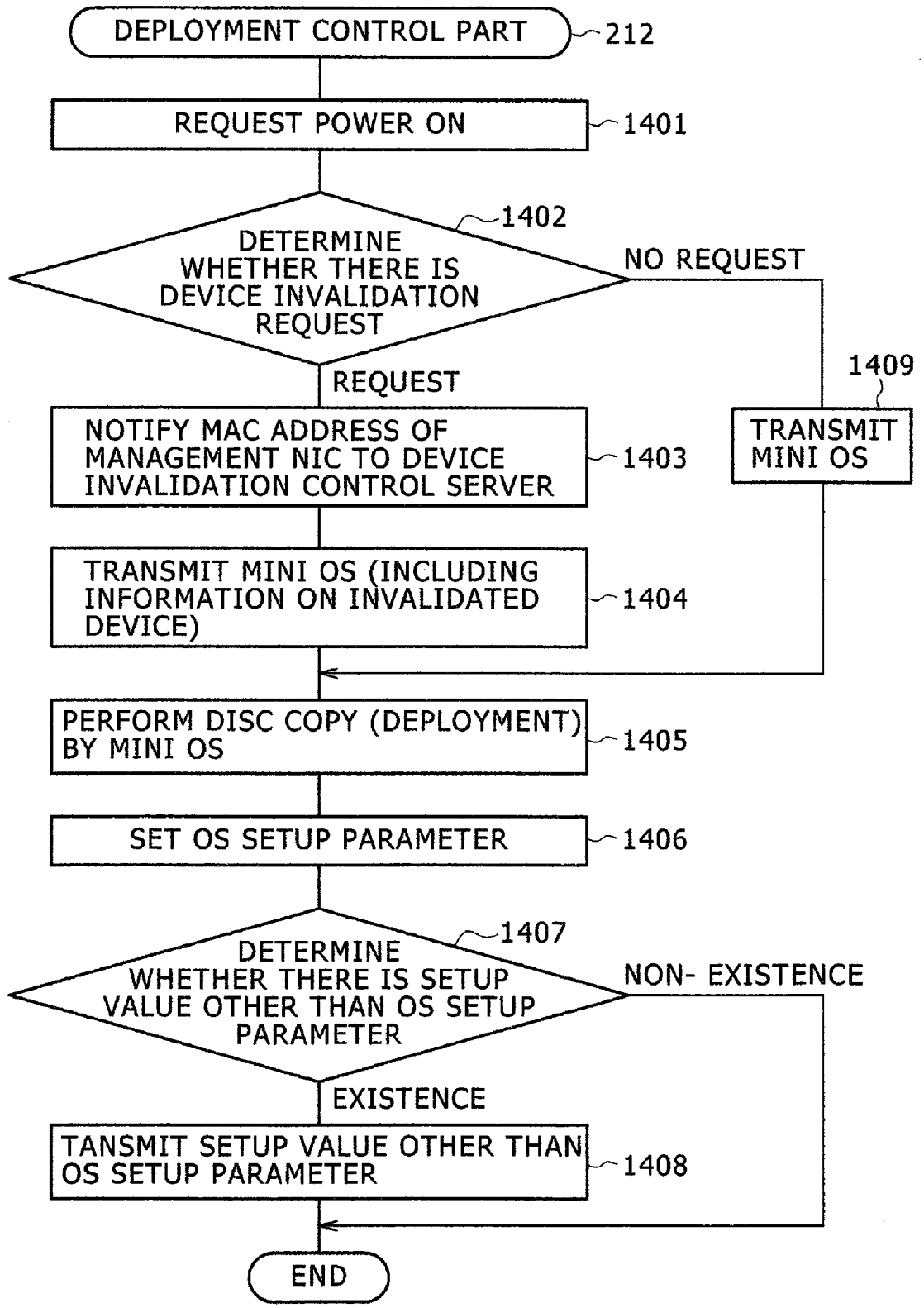
FIG. 13 is a flowchart illustrating a process performed by a deployment control part.

FIG. 13 shows a flowchart illustrating a process performed by the deployment control part 212. A power-on request is made in step 1401. It is determined in step 1402 whether or not there is any device invalidation request. If any, the process goes to step 1403, otherwise to step 1409.

The MAC address of the NIC connected to the network for management is notified to the device invalidation control part 213 in step 1403. The mini OS is transmitted corresponding to the PXE boot in step 1404. At this time, information on the NIC to be invalidated may be transmitted or the mini OS may communicate with the management server 101 to obtain information. In this step, a device that has been designated is invalidated (in a case where any device to be invalidated is designated) or a device that has not been designated is invalidated (in a case where any device used for deployment is designated) by using the BIOS setup. Meanwhile, the mini OS is transmitted not to conduct invalidation in step 1409.

The mini OS copies the disc image to the storage device of the blade server 103 subjected to deployment in step 1405. An OS setup parameter is set in step 1406. It is determined in step 1407 whether or not there exist any setup values other than the OS setup parameter. If any, the process goes to step 1408 and otherwise the process ends. The setup values other than the OS setup parameter are transmitted in step 1408 and the process ends.

Figure 14:
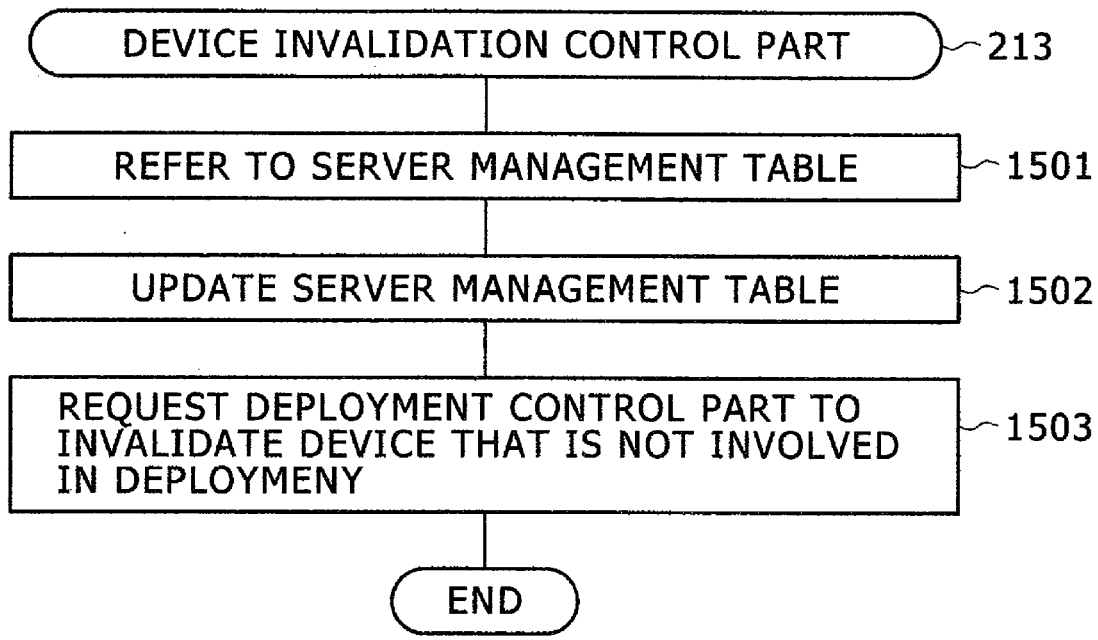
FIG. 14 is a flowchart illustrating a process performed by a device invalidation control part.

FIG. 14 is a flowchart illustrating a process performed by the device invalidation control part 213. The server management table 221 is referred to in step 1501. The server management table 221 is updated in step 1502. The deployment control part 212 is requested to invalidate any device that is not involved in the deployment in the step 1503 and then the process ends.

Figure 15:
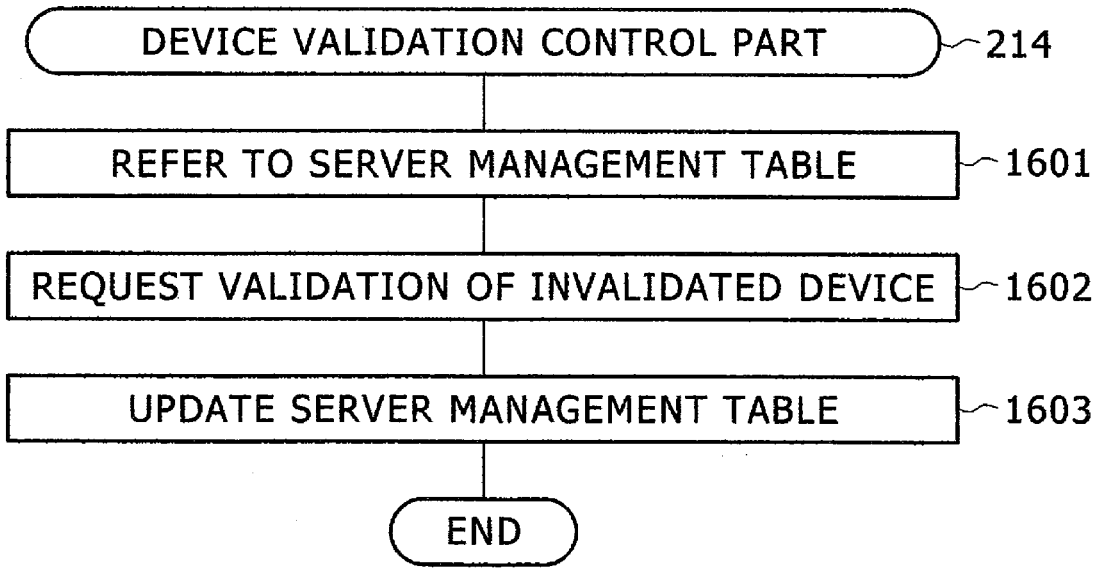
FIG. 15 is a flowchart illustrating a process performed by a device validation control part.

FIG. 15 is a flowchart illustrating a process performed by the device validation control part 214. The server management table 221 is referred to in step 1601. The invalidated device is requested to be validated in step 1602. The server management table 221 is updated in step 1603 and then the process ends.

Figure 16:
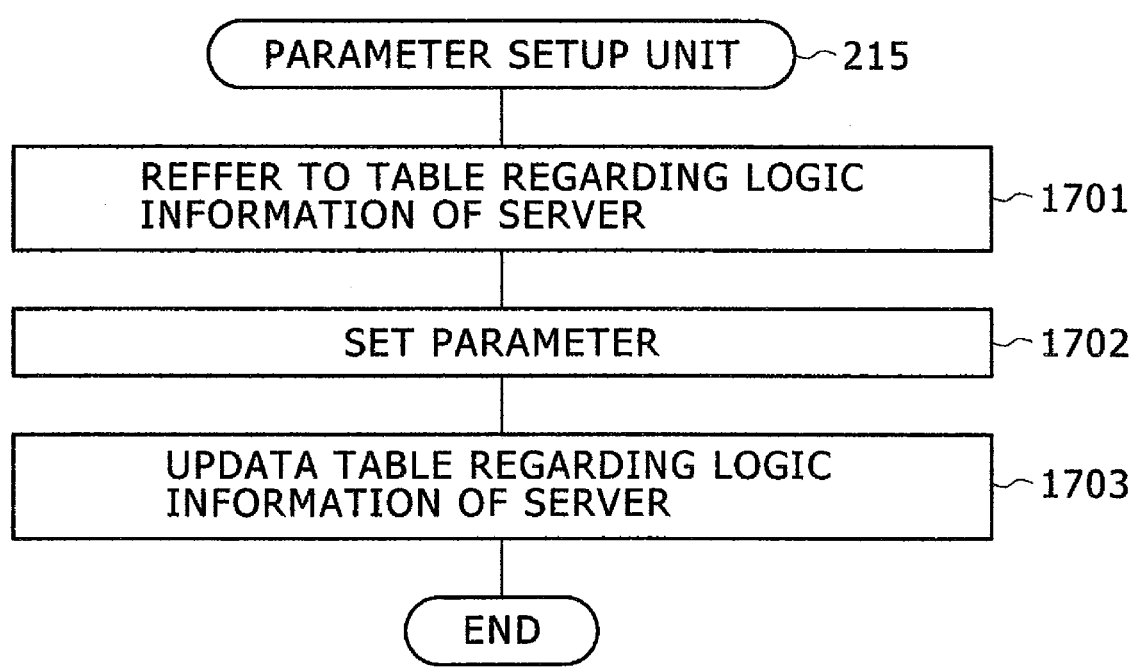
FIG. 16 is a flowchart illustrating a process performed by a parameter setup part.

FIG. 16 is a flowchart illustrating a process performed by the parameter setup part 215. The table 222 regarding the logic information of the server is referred to in step 1701.

Parameters are set in step 1702. The table 222 regarding the logic information of the server is updated in step 1703 and then the process ends.

Second Embodiment

The difference from the first embodiment lies in that the invalidation of a device is performed by OS functions and the invalidation is conducted in the first embodiment by using BIOS. Accordingly, processing orders or items are slightly varied from the first embodiment, and the description will focus on such difference.

Figure 17:
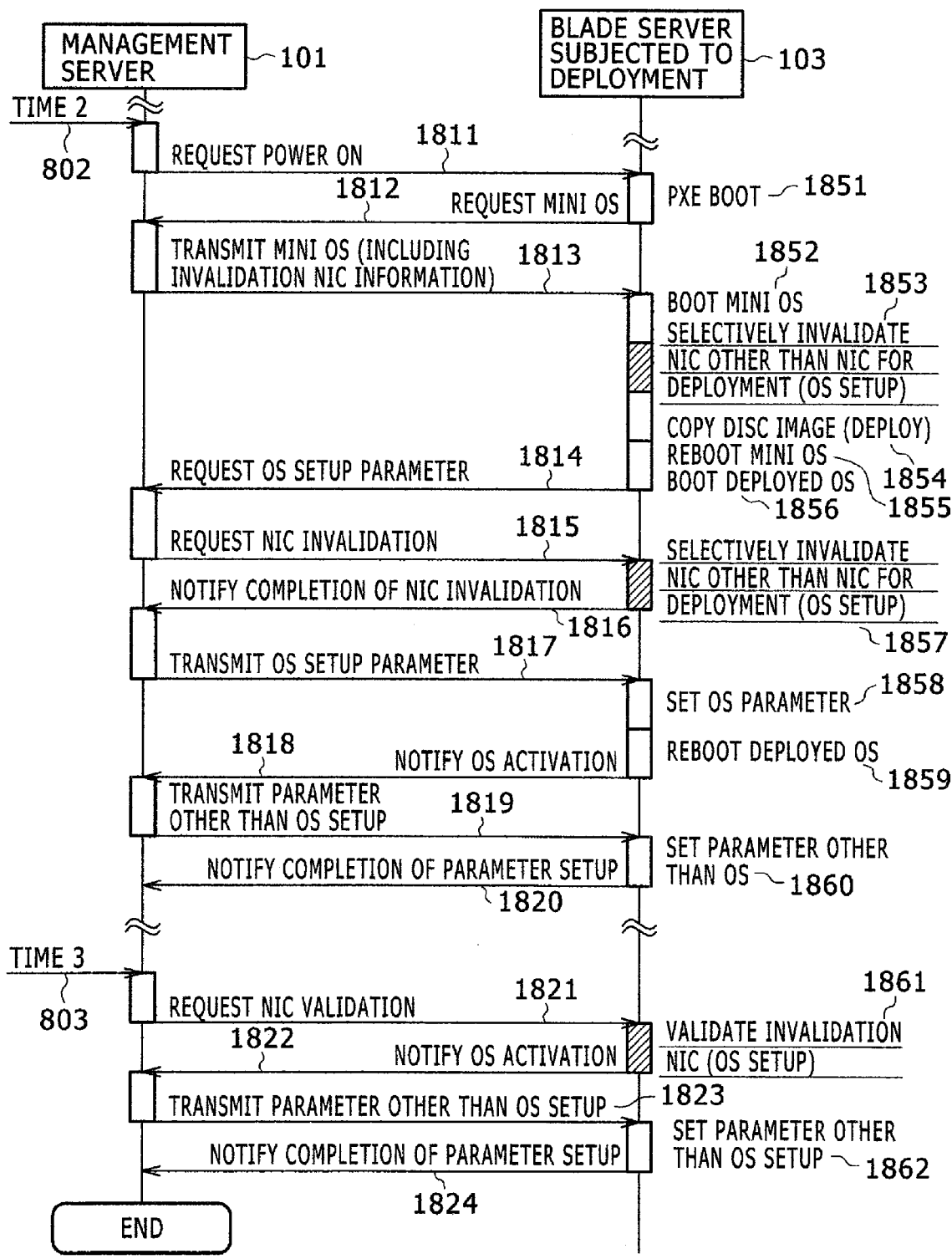
FIG. 17 is a view illustrating an operation sequence according to a second embodiment.

FIG. 17 is a view illustrating an operation sequence of the management server 101 and the blade server 103 subjected to deployment. The time 1 corresponding to step 801 is identical to that of the first embodiment, and its description will be omitted.

The alert at time 2 is notified in step 802. However, step 802 may be omitted depending on the type of alert so that the steps subsequent to the step at time 2 are carried out, or the process may end in the previous step (process at time 1). The management server 101 requests the blade server 103 subjected to deployment to power on in step 1811. The blade server 103 subjected to deployment powers on to initiate the PXE boot in step 1851. The blade server 103 subjected to deployment demands a mini OS from the management server 101 in t step 1812. The management server 101 transmits a mini OS to the blade server 103 subjected to deployment in step 1813. At this time, information on the device to be invalidated is also transmitted. Such information may be transmitted at the same time as transmission of the mini OS, or the mini OS is booted to perform communication with the management server 101 to obtain the information on the device to be invalidated. The blade server 103 subjected to deployment boots the mini OS in step 1852.

The blade server 103 subjected to deployment sets the OS to selectively invalidate any devices that are not involved in deployment in step 1853. Among data managed by the OS to control each device, data representing either validity/invalidity of the device is set to represent invalidity. For the setup, a program called "device manager" that is included in the OS and controls the device is used.

The service of the device is reactivated as necessary. Or, the OS itself reboots. In the case of rebooting, the process is restarted from step 1851. At this time, the management server 101 memorizes how many times the boot has been conducted. Or, the mini OS checks if the device that is desired to be invalidated is invalidated, and if invalidated, the process goes to next step. Unless invalidated, the invalidation is performed and, if necessary, reactivation of the service or reboot of the OS is done. This enables the blade server 103 subjected to deployment to be isolated from the network for business while the deployment is performed.

The blade server 103 subjected to deployment copies the disc image to the storage device in step 1854. The blade server 103 subjected to deployment reboots the mini OS in step 1855. The deployed OS is booted in step 1856.

The blade server 103 subjected to deployment requests an OS setup parameter in step 1814. The management server 101 makes an NIC invalidation request to the blade server 103 subjected to deployment in step 1815. The blade server 103 subjected to deployment selectively invalidates devices that are not involved in the deployment with OS functions in step 1857. The blade server 103 subjected to deployment sends an NIC invalidation notification to the management server 101 in step 1816.

The management server 101 transmits the OS setup parameter to the blade server 103 subjected to deployment in step 1817. The blade server 103 subjected to deployment sets the OS parameter in step 1858. The blade server 103 subjected to deployment performs rebooting in step 1859. The blade server 103 subjected to deployment transmits an OS activation notification to the management server 101 in step 1818.

The management server 101 transmits parameters other than the OS setup parameter to the blade server 103 subjected to deployment in step 1819. The blade server 103 subjected to deployment sets the parameters other than the OS setup parameter in step 1860. The blade server 103 sends the parameters other than the OS setup parameter to the management server 101 in step 1820.

The alert at time 3 is notified to the management server 101 in step 803. However, step 803 may be dropped depending on the type of alert so that the process proceeds to the steps subsequent to the step at time 3 or ends in step 1820.

The management server 101 transmits a validation request to the blade server 103 subjected to deployment to validate the invalidated device in step 1821. The blade server 103 subjected to deployment conducts a process of recovering (validating) the invalidated device with OS setup to reactivate the service of the device or reboot the OS in step 1861. This step is necessary in order to recover the process in terms of invalidating the device to execute the deployment. In addition, the process of recovering (validating) the device requires the above-mentioned program that is called device manager.

The blade server 103 subjected to deployment sends an OS activation notification or service reactivation completion notification to the management server 101 in step 1822. The management server 101 transmits the parameters other than the OS setup parameter to the blade server 103 subjected to deployment in step 1823. The blade server 103 subjected to deployment sets the parameters other than the OS setup parameter in step 1862. This step allows setup of parameters that could not be set because the device were invalidated. The blade server 103 subjected to deployment notifies the management server 101 that the parameters other than the OS setup parameter have been completely set up in step 1824 and then the process ends.

Figure 18:
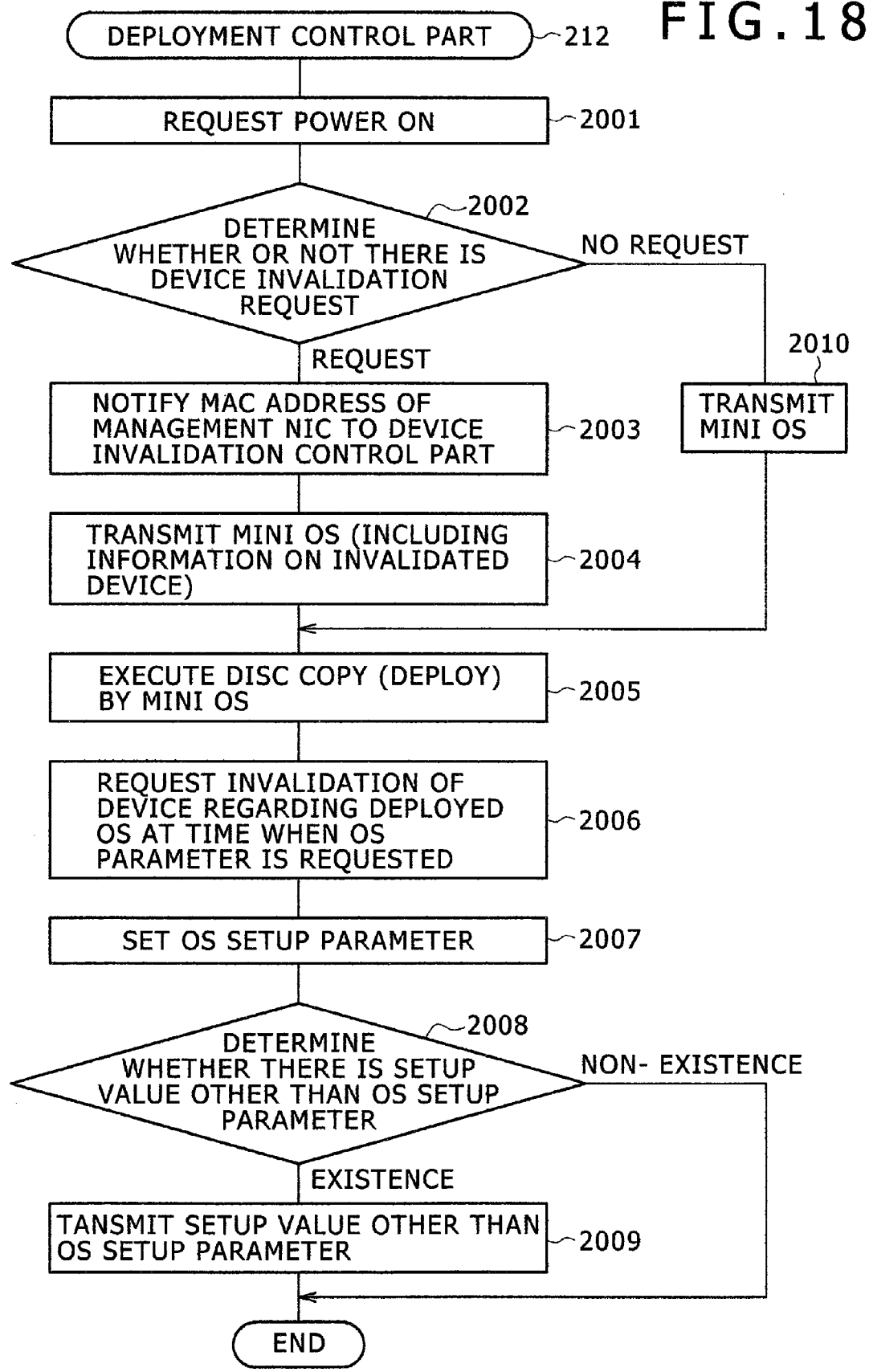
FIG. 18 is a flowchart illustrating a process performed by a deployment control part.

FIG. 18 shows a flowchart illustrating a process performed by the deployment control part 212. Power-on is requested in step 2001. It is determined in step 2002 whether or not there is any device invalidation request. If any, the process goes to step 2003 and otherwise to step 2010.

The MAC address of the NIC connected to the network for management is notified to the device invalidation control part 213 in step 2003. The mini OS corresponding to the PXE boot is transmitted in step 2004. At this time, information on the NIC to be invalidated may be transferred or the mini OS communicates with the management server 101 to obtain information. With respect to this step, a designated device is invalidated (in a case where the device to be invalidated is designated) or a device that has not been designated is invalidated (in a case where a device used for deployment is designated) by using the OS setup.

Meanwhile, the mini OS is transmitted in step 2010 and does not perform invalidation.

The mini OS copies a disc image to the storage device of the blade server 103 subjected to deployment in step 2005. Device invalidation is requested for the OS that has conducted the deployment at the time when the OS parameter was requested in step 2006. This step is one for executing invalidation using the OS functions. The OS setup parameter is set in step 2007.

It is determined in step 2008 whether or not there exist any setup values other than the OS setup parameter. If any, the process goes to step 2009 and otherwise the process ends. The setup values other than the OS setup parameter are transmitted in step 2009 and then the process ends.

Figure 19:
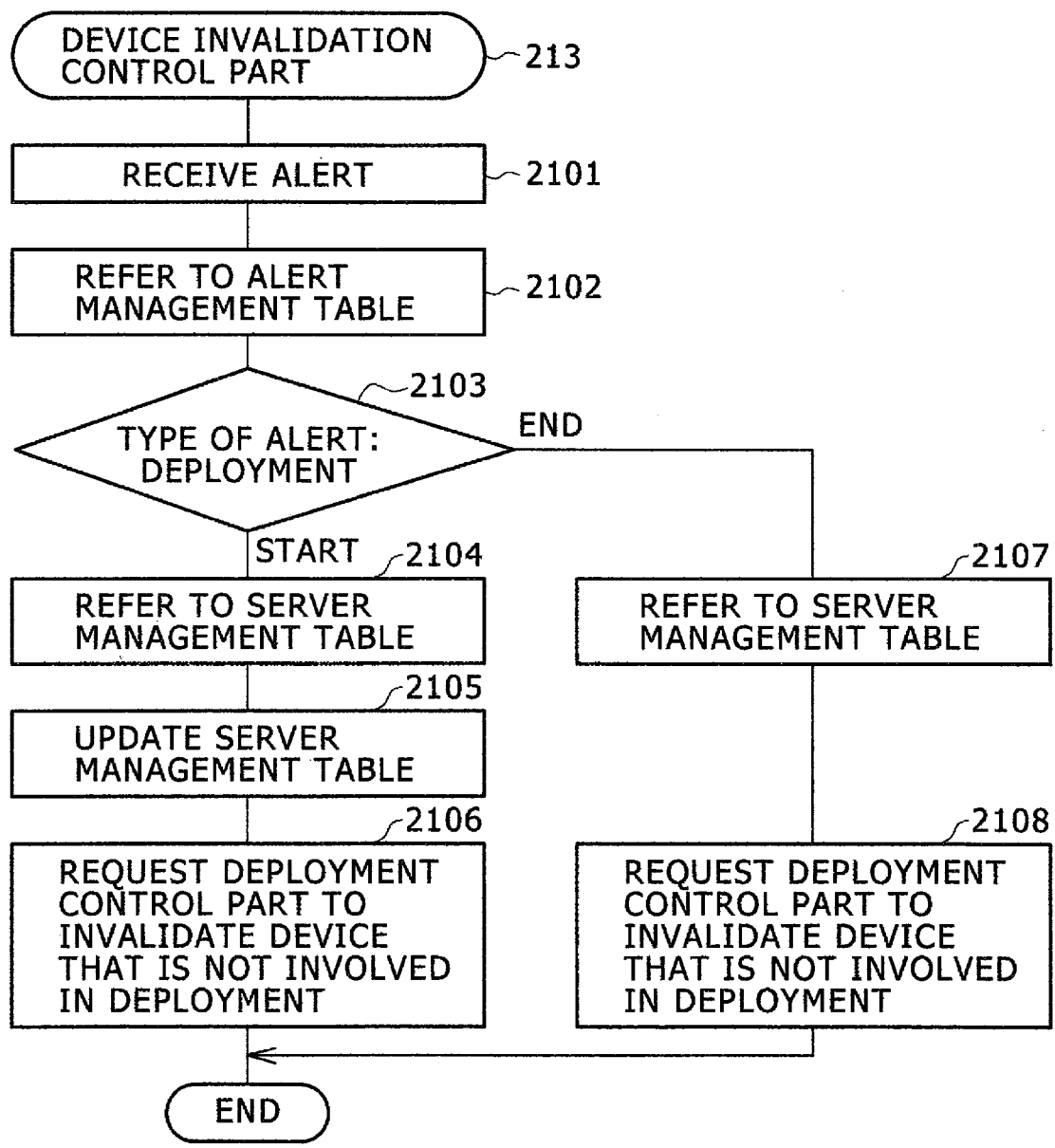
FIG. 19 is a flowchart illustrating a process performed by a device invalidation control part.

FIG. 19 shows a flowchart illustrating a process performed by the device invalidation control part 213. An alert is received in step 2101. The alert management table 223 is referred to in step 2102. The type of alert is determined in step 2103. If the type of alert is "initiate", the process goes to step 2104, and if "complete", the process goes to step 2107.

The server management table 221 is referred to in step 2104. The server management table 221 is updated in step 2105. The deployment control part 212 is requested to invalidate devices that are not involved in the deployment in step 2106, and then the process ends.

During "initiate", it is confirmed that the "initial value" (column 509) in the server management table 221 is set to "valid", the "state" (column 510) to "valid", and invalidation is conducted. The server management table 221 is referred to in the server scanning part 2107. A request is made to the deployment control part 212 to invalidate the device that is not involved in the deployment in step 2108, and then the process ends.

In the "end", it is confirmed that the "state" in the server management table 221 (column 510) is set to "invalid", and then invalidation is conducted. The "end" refers to the same table as that of the "start", but both are different from each other in the column to be referred to and the determination criteria.

Third Embodiment

The difference of third embodiment from the first and second embodiments lies in that invalidation of a device is carried out by hardware.

Figure 20:
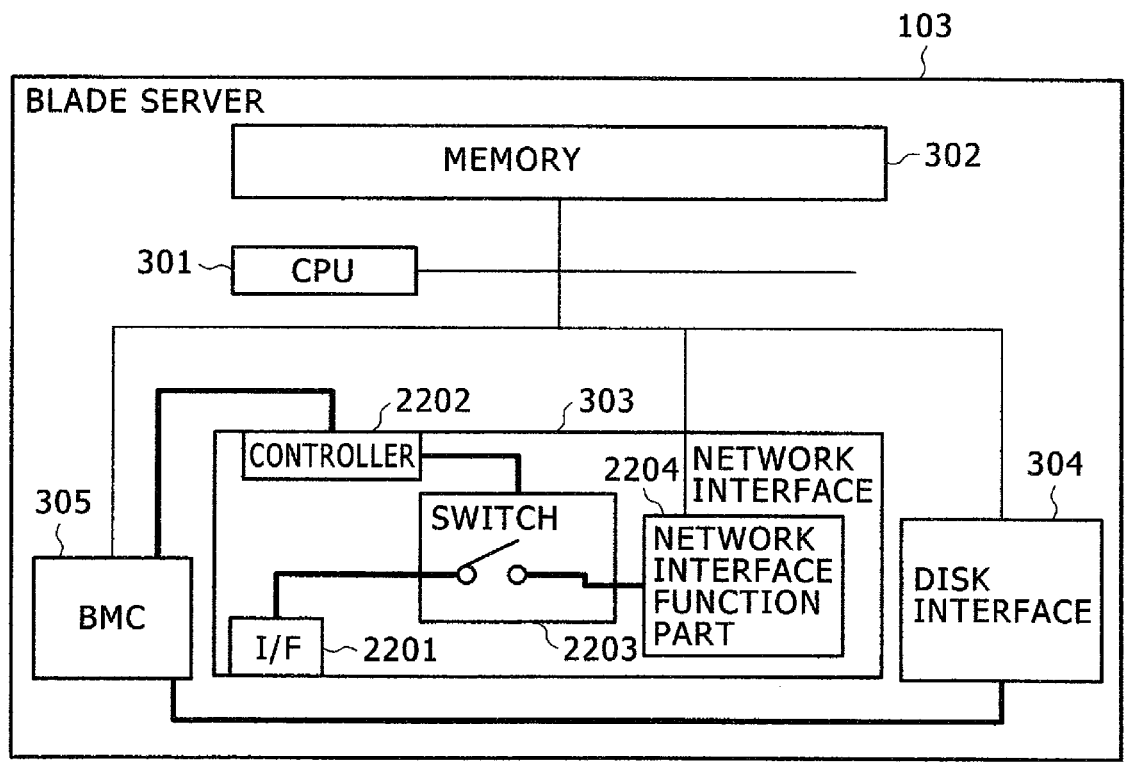
FIG. 20 is a view illustrating a configuration of a blade server according to a third embodiment.

FIG. 20 shows a configuration of the blade server 103 according to the third embodiment. The blade server 103 includes a CPU 301 that process the operation, a memory 302 that stores a program operated by the CPU 301 and data coming as a result of execution of the program, a disc interface 304 that interfaces with a storage device storing the program or data, a network interface 303 that performs communication through an IP network, and a BMC (Basement Management Controller) 305 that controls power or each interface. The OS stored in the memory 302 is executed by the CPU 301 to manage devices in the blade server 103. Application providing a business is operated under the OS 311.

The network interface 303 includes an interface 2201 that transmits and receives packets, a controller 2202 that receives an instruction from the BMC 305 to control a switch 2203, the switch 2203 that physically changes an ON/OFF state of a network interface function part 2204 and the interface 2201, and the network interface function part 2204. The BMC 305 is connected to the management server 101 and receives a connection state changing request from the management server 101 to issue an instruction of physically changing ON/OFF the connection to the controller 2202. This enables the network interface function part 2204 to be isolated from the external network. It is possible to leave the blade server 103 isolated from the network that physically provides a business by keeping the physical connection state off while the deployment is performed in spite of the device being valid from the OS operated with the blade server 102. This configuration of including the switch may be owned by the disc interface 304 as well as by the network interface 303. By doing so, the storage device that is not involved in the deployment may be isolated so that the system is kept away from risks such as data corruption.

Figure 21:
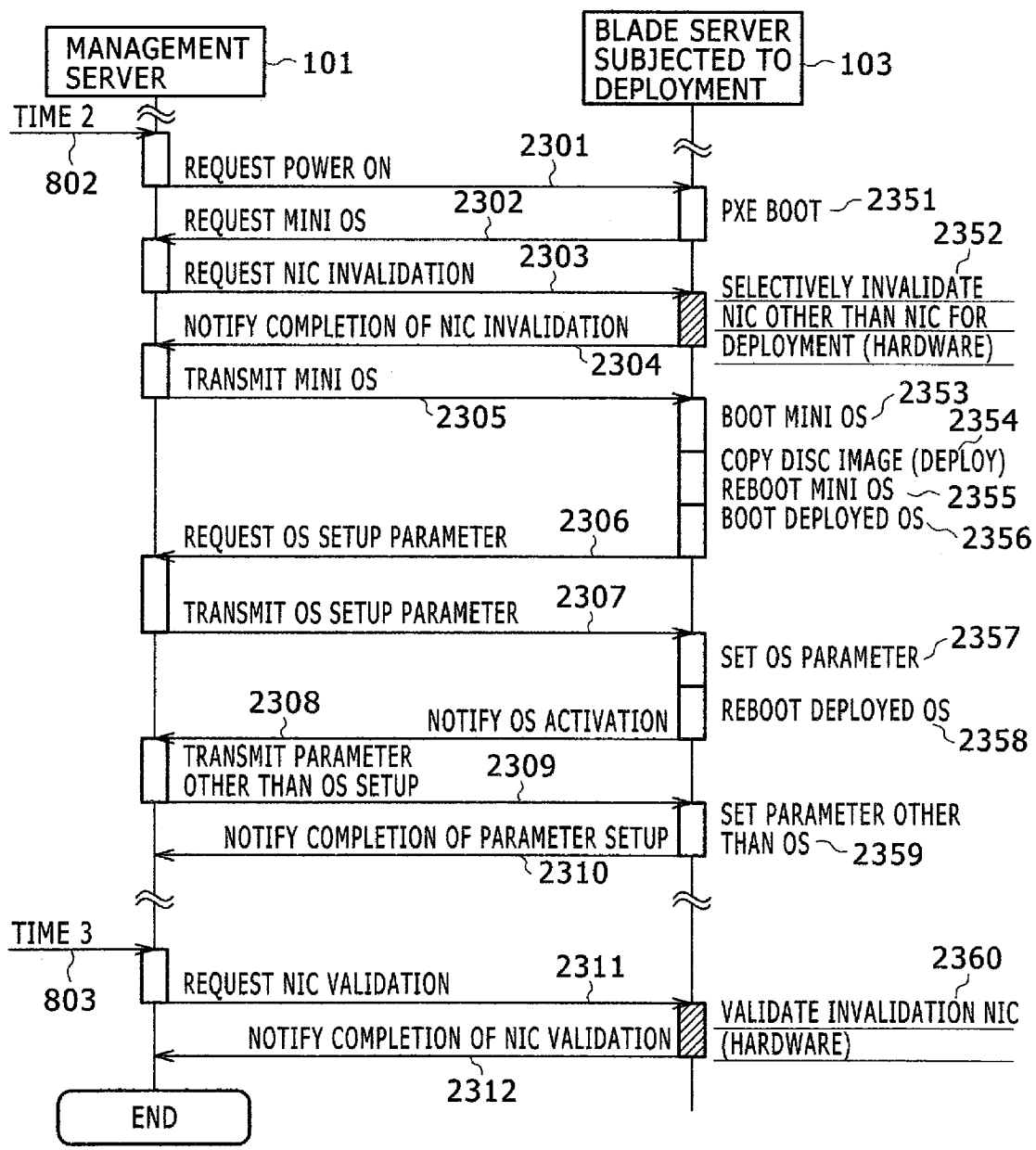
FIG. 21 is a view illustrating an operation order according to the third embodiment.

FIG. 21 is a view illustrating an operation sequence of the management server 101 and the blade server 103 subjected to deployment. The time 1 corresponding to step 801 is identical to that in the first embodiment, and thus its description will be omitted. An alert at time 2 is notified to the management server 101 in the step 802. However, step 802 may be dropped depending on the type of alert so that the steps subsequent to step 802 at time 2 proceed or the process ends in the previous step (step at time 1).

The management server 101 requests the blade server 103 subjected to deployment to power on in step 2301. The blade server 103 subjected to deployment powers on to initiate PXE boot in step 2351.

The blade server 103 subjected to deployment demands a mini OS from the management server 101 in step 2302. The management server 101 requests the BMC 305 in the blade server 103 subjected to deployment to selectively invalidate devices that are not involved in the deployment in step 2303. The BMC 305 requests the controller 2202 of the device to let the connection state of the switch 2203 turn off. The blade server 103 subjected to deployment transmits a device invalidation completion notification to the management server 101 in step 2304. The BMC 305 in the blade server 103 subjected to deployment sends the device invalidation completion notification to the management server 101.

The management server 101 transmits a mini OS to the blade server 103 subjected to deployment in step 2305. The blade server 103 subjected to deployment boots the mini OS in step 2353. The blade server 103 subjected to deployment copies a disc image to the storage device in step 2354. The blade server 103 subjected to deployment reboots the mini OS in step 2355. The deployed OS is booted in step 2356.

The blade server 103 subjected to deployment requests an OS setup parameter in step 2306. The management server 101 transmits the OS setup parameter to the blade server 103 subjected to deployment in step 2307. The blade server 103 subjected to deployment sets the OS parameter in step 2357. The blade server 103 subjected to deployment executes a reboot in step 2358. The blade server 103 subjected to deployment transmits an OS activation notification to the management server 101 in step 2308.

The management server 101 transmits parameters other than the OS setup parameter to the blade server 103 subjected to deployment in step 2309. The blade server 103 subjected to deployment sets the parameters other than the OS setup parameter in the 2359. In this step, all the remaining parameters may be set. This results from a fact that the only the connection turns on/off with the device remaining valid. The blade server 103 subjected to deployment transmits a setup completion notification of the parameter other than the OS setup parameter to the management server 101 in step 2310.

An alert at time 3 is notified to the management server 101 in step 803. However, step 803 may be dropped depending on the type of alert so that the steps subsequent to the step at time 3 proceed or the process ends in step 2310. The management server 101 sends a validation request of the invalidated device to the blade server 103 subjected to deployment in step 2311. The blade server 103 subjected to deployment performs a process of recovering (validating) the invalidated device by turning on the connection state of the switch 2203 in response to an instruction from the BMC 305 in step 2360. This step relates to a recovery process necessary for invalidating the device in order to execute the deployment. It is necessary neither to reactivate the service of the device nor to reboot the OS in order to turn on/off only the connection state with the device remaining valid. The blade server 103 subjected to deployment sends a device validation completion notification to the management server 101 in step 2312 and then the process ends.

In addition, when the switch 2203 is inserted into the blade server 103, the blade server 103 (for example, the BMC 305) may detect such insertion to instruct the controller 2202 to turn off the connection. Further, the switch connection may be turned off upon alert regarding any fault. This fault alert may be similar to either hardware or software such as an OS.

Figure 22:
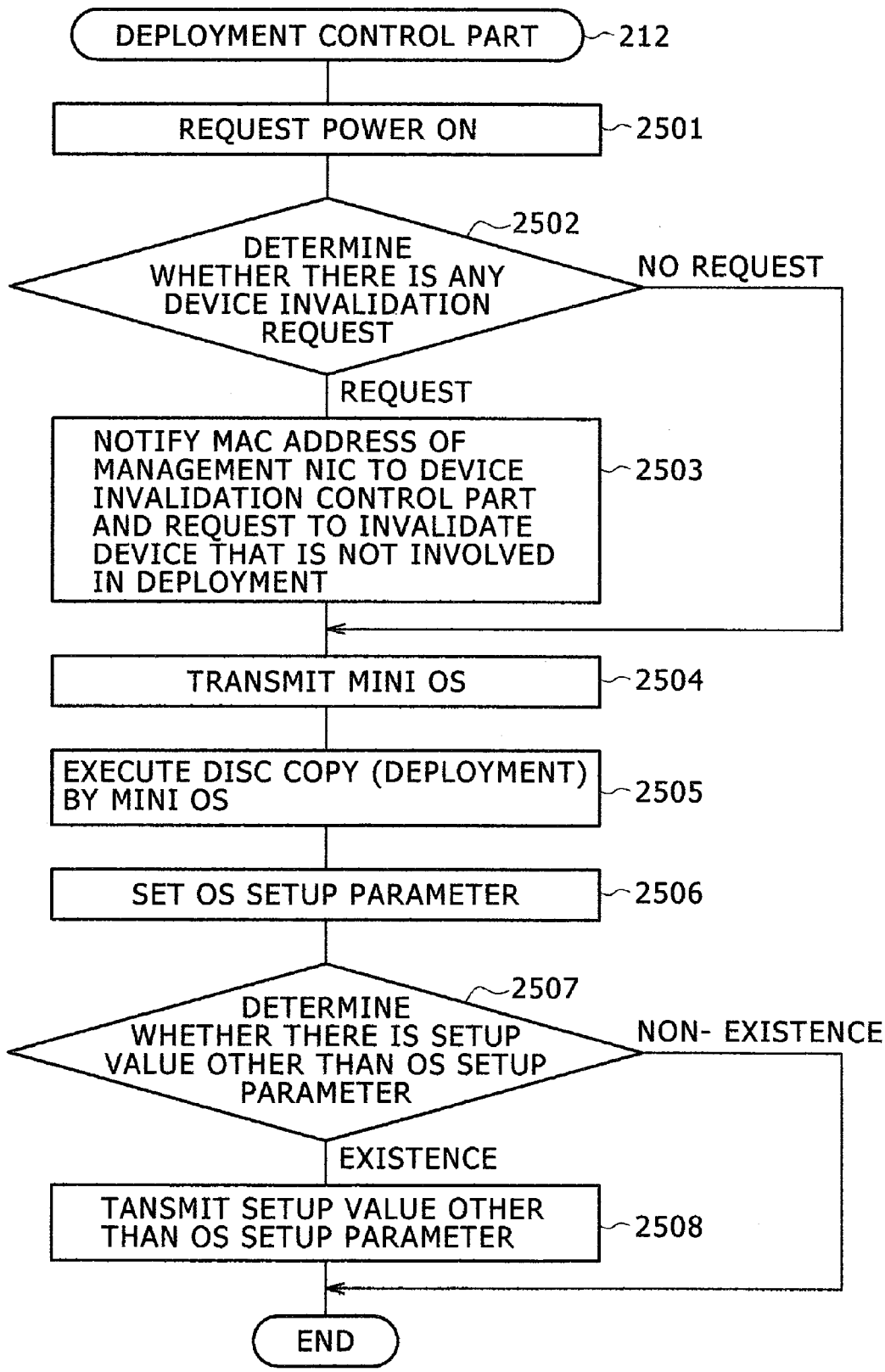
FIG. 22 is a flowchart illustrating a process performed by a deployment control part.

FIG. 22 shows a flowchart illustrating a process performed by the deployment control part 212 according to the third embodiment. Power-on is requested in step 2501. It is determined in step 2502 whether or not there is any device invalidation request. If any, the process goes to step 2503, and otherwise to step 2504.

The MAC address of the NIC connected to the network for management is notified to the device invalidation control part 213 in step 2503.

A mini OS corresponding to PXE boot is transmitted in step 2504. The mini OS copies a disc image to the storage device of the blade server 103 subjected to deployment in step 2505. An OS setup parameter is set in step 2506.

It is determined in step 2507 whether or not there are any setup values other than the OS setup parameter. If any, the process goes to step 2508, and otherwise the process ends. The setup values other than the OS setup parameter are transmitted in step 2508 and then the process ends.

Figure 23:
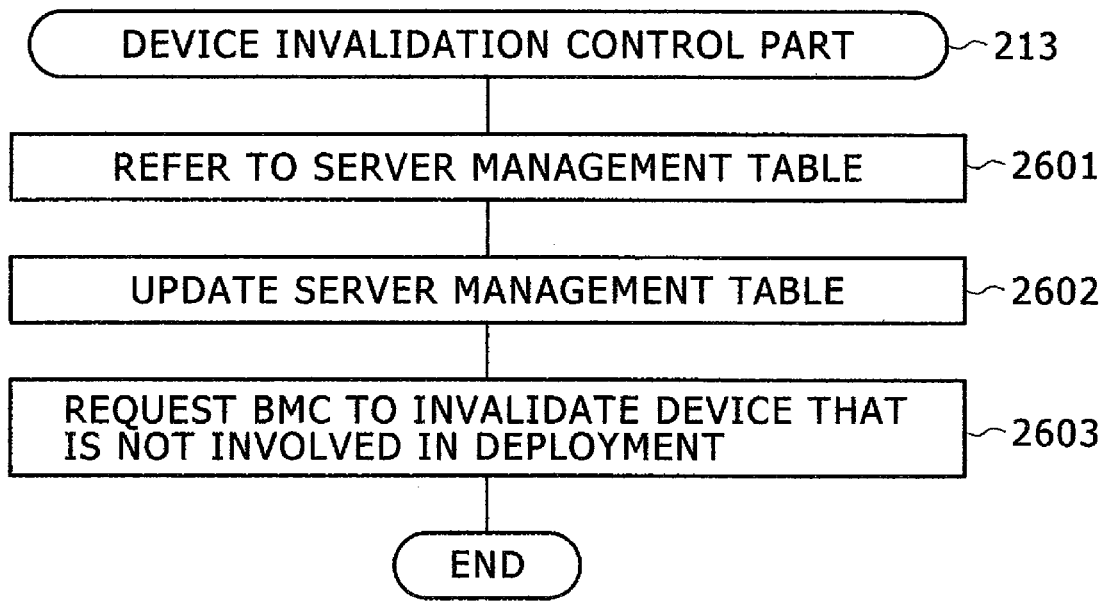
FIG. 23 is a flowchart illustrating a process performed by a device invalidation control part.

FIG. 23 shows a flowchart illustrating a process performed by the device invalidation control part 213 according to the third embodiment. The server management table 221 is referred to in step 2601. The server management table 221 is updated in step 2602.

The BMC 305 is requested to invalidate devices that are not involved in deployment in step 2603, and then the process ends. The BMC 305 requests the controller 2202 in the network interface 303 to let the switch 2203 to turn off physical connection between the network interface function part 2204 and the interface 2201. In the configuration according to this embodiment, it looks like the device normally operates since the network interface function part 2204 is operated from the OS running on the blade server 103. Accordingly, parameters where it impossible to function while the device does not operate may be set, too. The same effect may also apply to the disc interface 304 as long as it has the same device configuration. Further, it is possible to protect data in the storage device from being damaged since the storage device may be isolated by turning off the connection state during the execution of the deployment.

Figure 24:
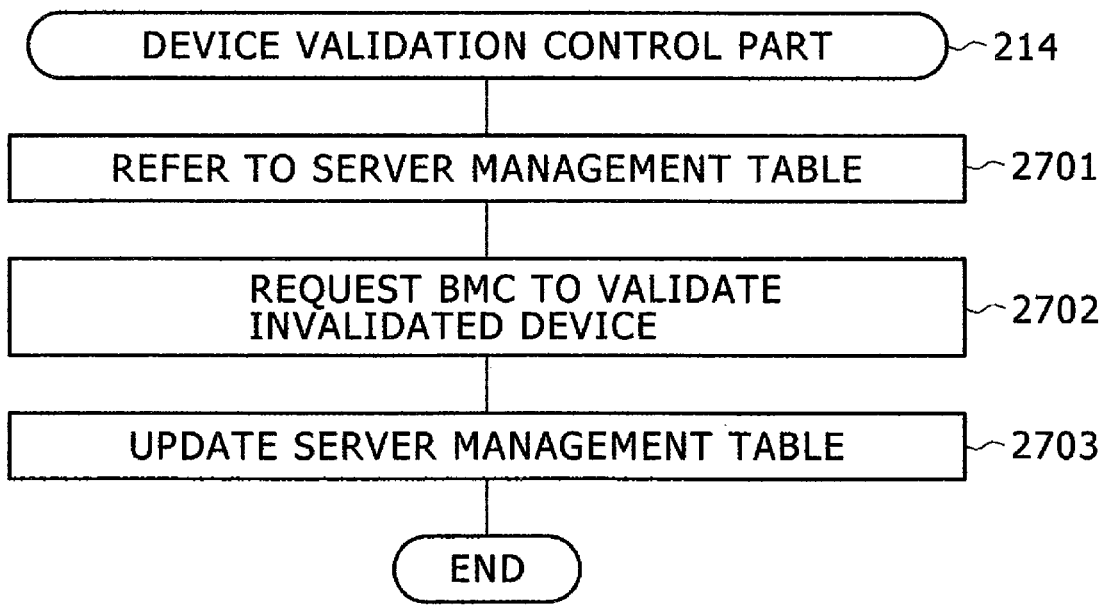
FIG. 24 is a flowchart illustrating a process performed by a device validation control part.

FIG. 24 is a flowchart illustrating a process performed by the device validation control part 214. The server management table 221 is referred to in step 2701. A request is made to the BMC 305 to invalidate the invalidated device in step 2702. The BMC 305 requests the controller 2202 in the network interface 303 to let the switch 2203 to turn on the physical connection between the network interface function part 2204 and the interface 2201. The server management table 221 is updated in step 2703 and then the process ends.

Figure 25:
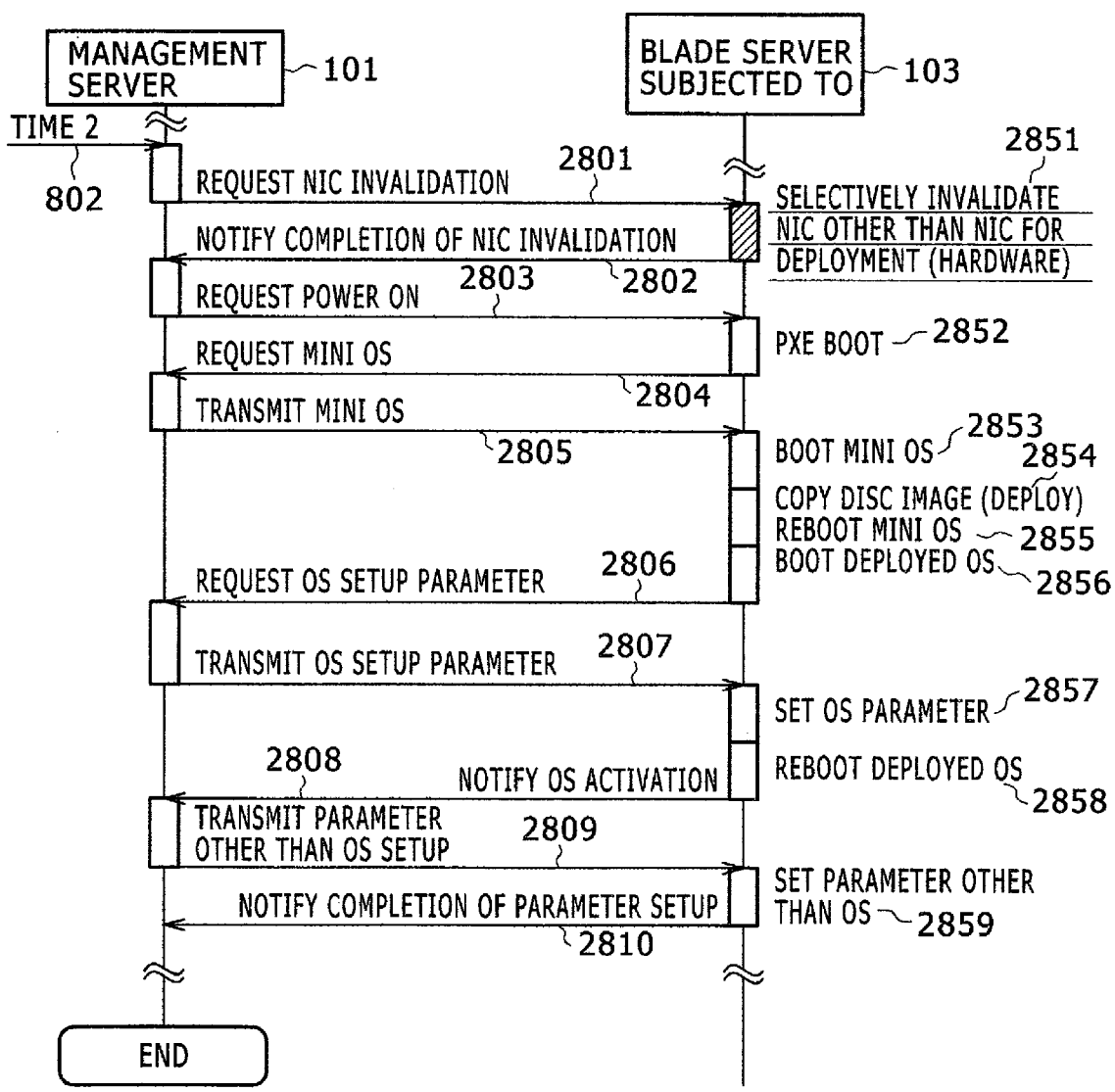
FIG. 25 is a view illustrating another operation order according to the third embodiment.

FIG. 25 is a view illustrating an operation sequence of the management server 101 and the blade server 103 subjected to deployment. FIG. 25 is different from FIG. 21 in timing of invalidating the device. The order posterior to time 3 (step 803) is identical to that of FIG. 21, and its descriptions will be omitted. The time 1 corresponding to step 801 is identical to that in the first embodiment and thus its descriptions will be omitted.

An alert at time 2 is notified to the management server 101 in step 802. However, step 802 may be dropped depending on the type of alert so that the steps subsequent to the step at time 2 proceed or the process ends in the previous step (the step at time 1).

The management server 101 requests the BMC 305 included in the blade server 103 subjected to deployment to selectively invalidate the device that is not involved in the deployment in step 2801. The BMC 305 requests the controller 2202 of the device to turn off the connection state of the switch 2203 in step 2851. The blade server 103 subjected to deployment sends a device invalidation completion notification to the management server 101 in step 2802. The BMC 305 in the blade server 103 subjected to deployment transmits the device invalidation completion notification to the management server 101.

The management server 101 requests the blade server 103 subjected to deployment to power on in step 2803. The blade server 103 subjected to deployment powers on to initiate PXE boot in step 2852.

The blade server 103 subjected to deployment demands a mini OS from the management server 101 in step 2804. The management server 101 transmits the mini OS to the blade server 103 subjected to deployment in step 2805. The blade server 103 subjected to deployment boots the mini OS in step 2853. The blade server 103 subjected to deployment copies a disc image to the storage device in step 2854. The blade server 103 subjected to deployment reboots the blade server 103 subjected to deployment in step 2855. The deployed OS is booted in step 2856.

The blade server 103 subjected to deployment requests an OS setup parameter in step 2806. The management server 101 transmits the OS setup parameter to the blade server 103 subjected to deployment in step 2807. The blade server 103 subjected to deployment sets the OS setup parameter in step 2857. The blade server 103 subjected to deployment executes rebooting in step 2858. The blade server 103 subjected to deployment transmits an OS activation notification to the management server 101 in step 2808.

The management server 101 transmits parameters other than the OS setup parameter to the blade server 103 subjected to deployment in step 2809. The blade server 103 subjected to deployment sets the parameters other than the OS setup parameter in step 2859. In this step, all the remaining parameters may be set. This results from a fact that only the connection state is turned on/off with the device remaining valid. The blade server 103 subjected to deployment transmits a setup completion notification of the parameters other than the OS setup parameter to the management server 101 in step 2810.

An advantage of the process flow based on this order is that there is no need to change a common deployment process order. This may facilitate application to utilizing deployment or conventional deployment product.

Figure 26:
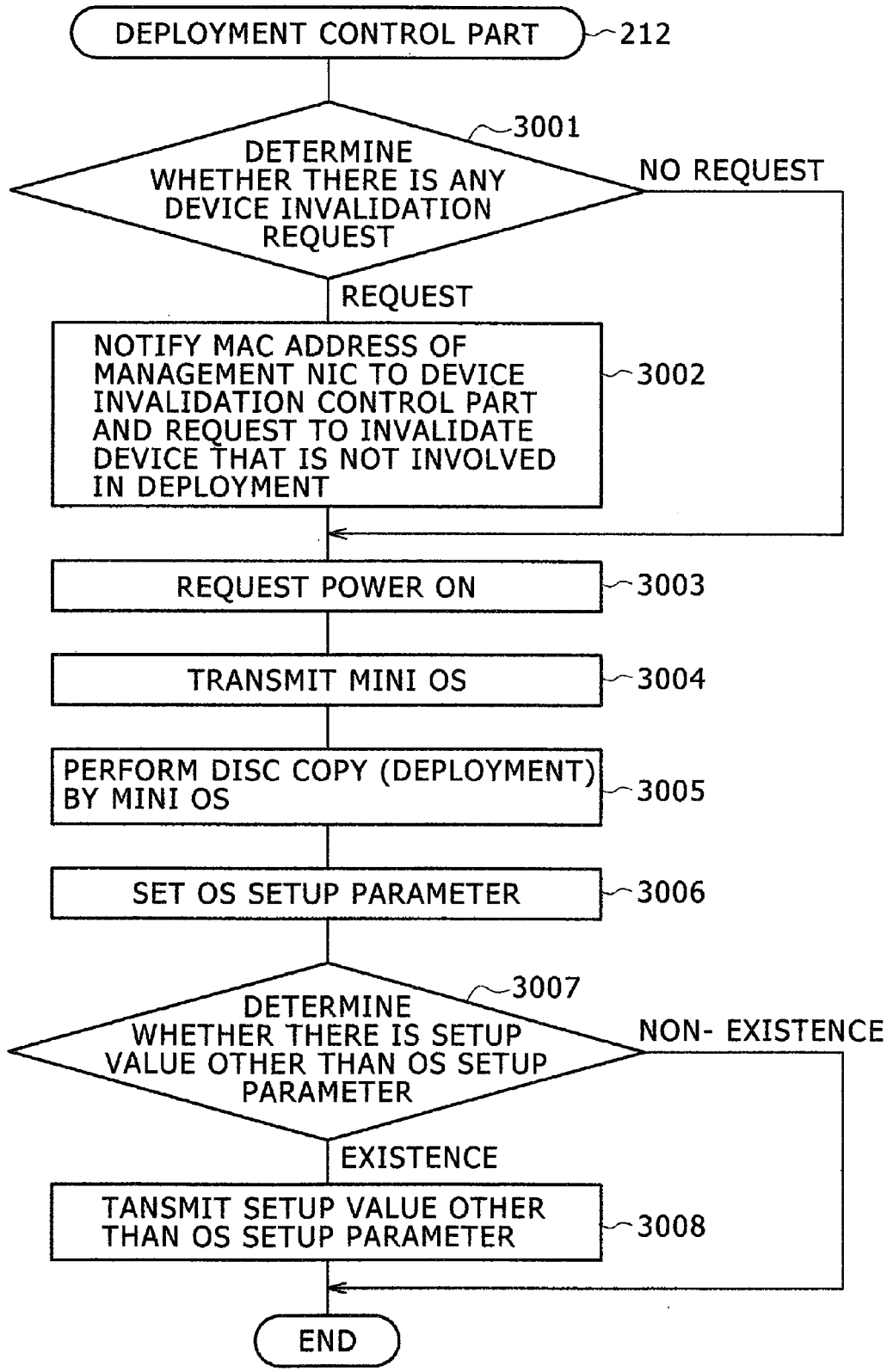
FIG. 26 is a flowchart illustrating a process performed by a deployment control part.

FIG. 26 is a flowchart illustrating a process performed by the deployment control part 212 according to the third embodiment. FIG. 26 is different from FIG. 22 in timing of invalidating the device.

It is determined in the step 3001 whether or not there is any device invalidation request. If any, the process goes to step 3002 and otherwise to step 3003. The MAC address of the NIC connected to the network for management is notified to the device invalidation control part 213 in step 3002.

Power-on is requested in step 3003. A mini OS corresponding to PXE boot is transmitted in step 3004. The mini OS copies a disc image to the storage device of the blade server 103 subjected to deployment in step 3005. The OS setup parameter is set in step 3006.

It is determined in step 3007 whether or not there are any setup values other than the OS setup parameter. If any, the process goes to step 3008 and otherwise the process ends. The setup values other than the OS setup parameter are transmitted in step 3008 and the process ends.

The device invalidation control part 213 and the device validation control part 214 are identical to those shown in FIG. 23 and FIG. 24, respectively, and thus the descriptions will be omitted.

Fourth Embodiment

The fourth embodiment is different from the first, second, and third embodiments in that the invalidation of a device is carried out by server virtualization technology.

Figure 27:
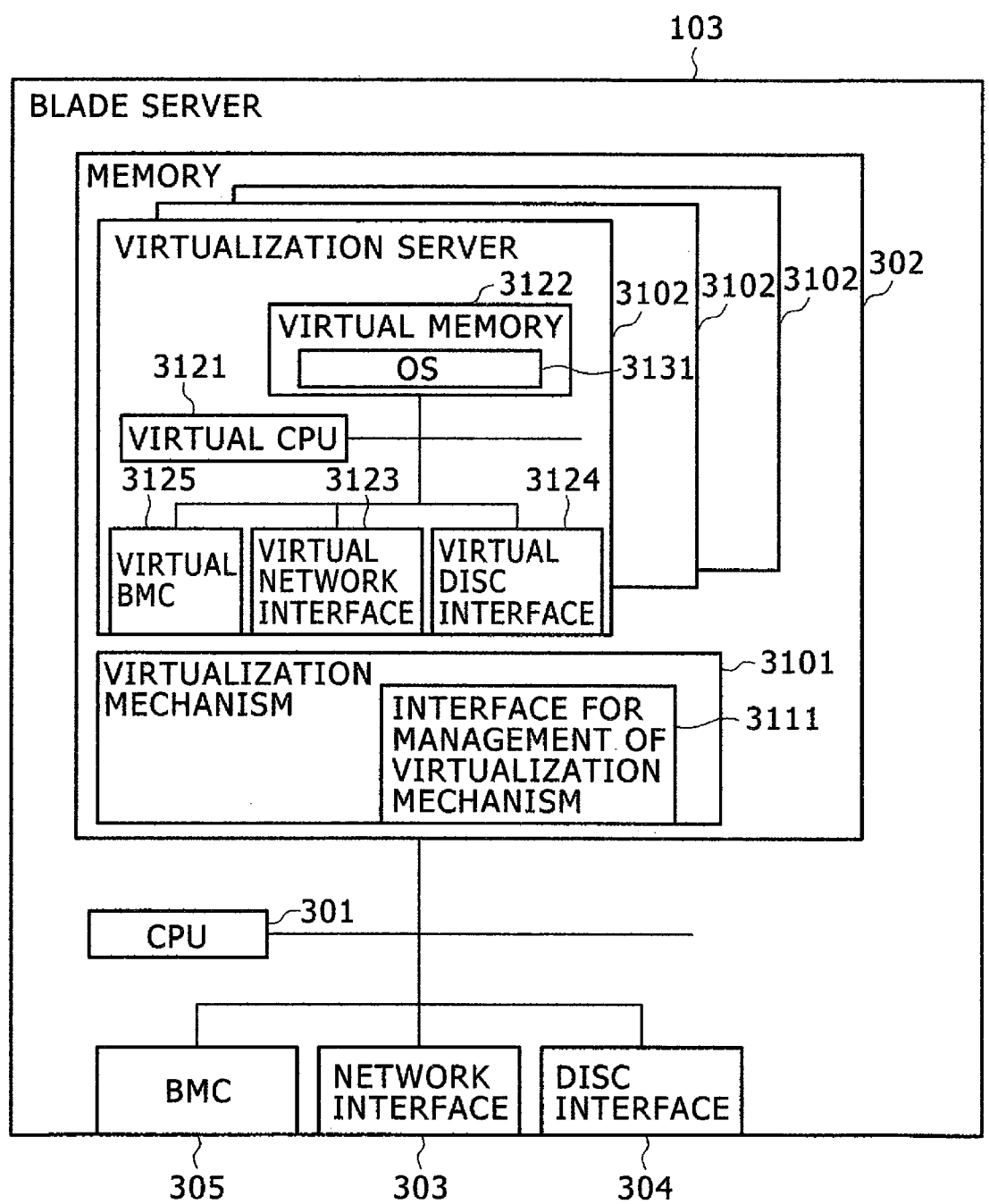
FIG. 27 is a view illustrating a configuration of a blade server according to a fourth embodiment.

FIG. 27 shows a configuration of the blade server 103 according to the fourth embodiment. The blade server 103 includes a CPU 301 that processes the operation, a memory 302 that stores a program operated by the CPU 301 or data coming as a result of execution of the program, a disc interface 304 that interfaces with a storage device storing the program or data, a network interface 303 for performing communications through an IP network, and a BMC (Basement Management Controller) 305 that executes control of each interface or power control. The memory 302 has a virtualization mechanism 3101 providing a server virtualization technology that virtualizes computer resources and provides a virtualization server 3102. The virtualization mechanism 3101 has an interface 3111 for management of the virtualization mechanism as an interface for control. The virtualization mechanism 3101 virtualizes the computer resources of the blade server 103 and configures the virtualization server 3102. The virtualization server 3102 includes a virtual CPU 3121, a virtual memory 3122, a virtual network interface 3123, and a virtual disc interface 3124. An OS is transferred to the virtual memory 3122 to manage the virtual device in the virtualization server 3102. The virtualization mechanism 3101 manages a corresponding part between a physical device and a logical device to be capable of making a correspondence or release the corresponding part. It is possible to logically isolate the virtual server from the network to which the physical device is connected by releasing the corresponding part between the logical device and the physical device. Or, it is possible to logically isolate the virtual server 3102 from the network to which the physical device is connected by blocking the virtual device from the interface 3111 for management of the virtualization mechanism or suppressing communication to the virtualization server 3102 through the virtualization mechanism 3101. This isolating method makes it possible to conduct "isolation of the server from the network for business" that has been described in the first to third embodiments.

Figure 28:
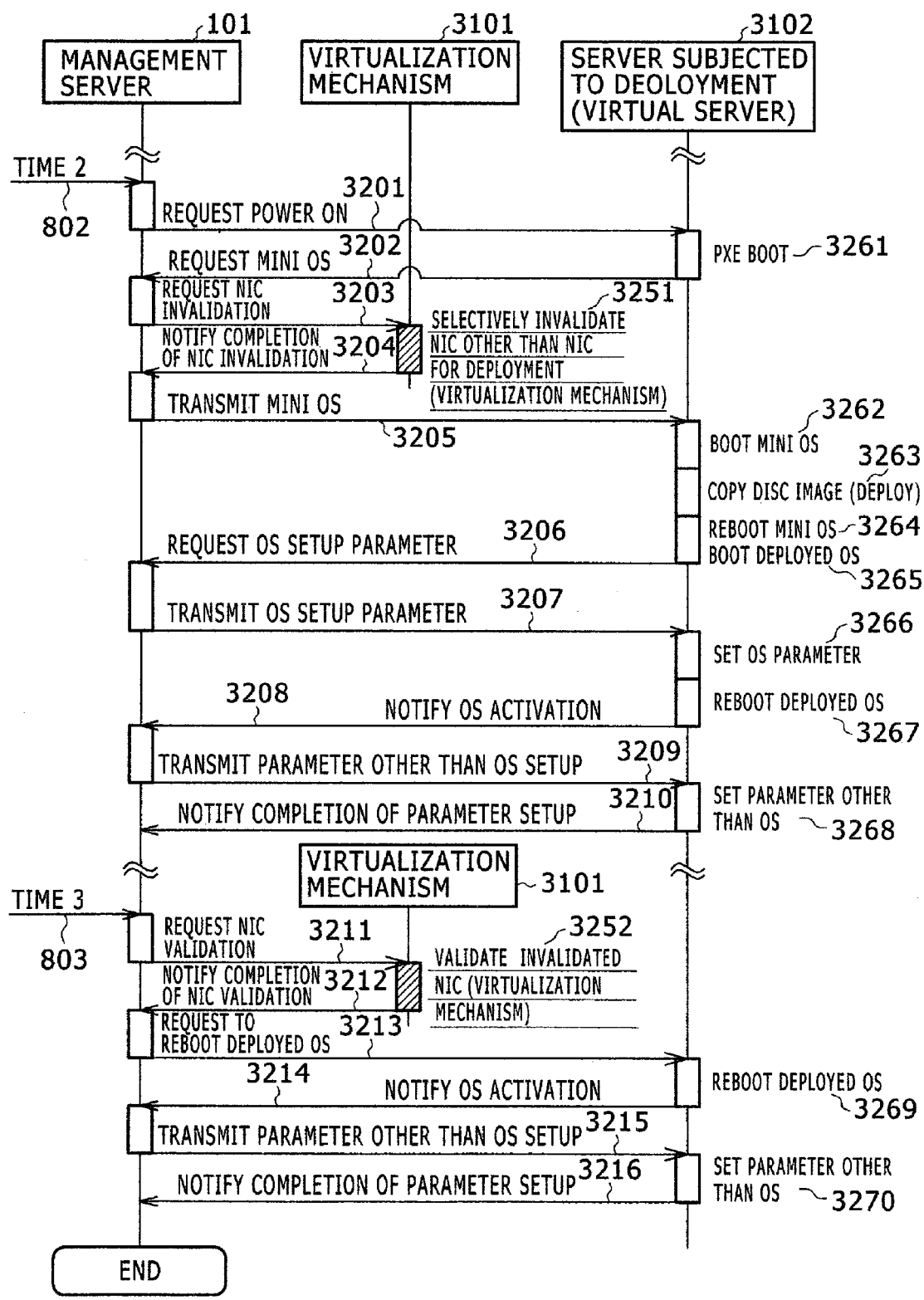
FIG. 28 is a view illustrating an operation order according to the fourth embodiment.

FIG. 28 is a view illustrating an operation sequence of the management server 101, the virtualization server 3102 subjected to deployment, and the virtualization mechanism 3101. The time 1 corresponding to step 801 is identical to that of the first embodiment and its description will be omitted. An alert at time 2 is notified to the management server 101 in step 802. However, step 802 may be dropped depending on the type of alert so that the steps subsequent to the step at time 2 proceed or the process ends in the previous step (the process at time 1).

The management server 101 requests the virtualization server 3102 subjected to deployment to power on in step 3201. The virtualization server 3102 subjected to deployment powers on to initiate PXE boot in step 3261.

The virtualization server 3102 demands a mini OS from the management server 101 in step 3202. The management server 101 requests the virtualization mechanism 3101 to invalidate the device in step 3203. The management server 101 transmits the request to the virtualization mechanism 3101 through the interface 3111 for management of the virtualization mechanism.

The virtualization mechanism 3101 selectively invalidates the device unnecessary for deployment in step 3251. The invalidation method may include temporarily releasing a corresponding part between a physical device and a virtual device, temporarily blocking the virtual device, and suppressing communications of the virtual device. Releasing the corresponding part is implemented by rewriting data in a corresponding part table, for example, so that there is no physical device corresponding to the virtual device, or not conducting conversion between the virtual device and the physical device. The latter method is directed to blocking or suppressing the virtual device, wherein the virtual device to be subjected to invalidation is identified as being the one to be invalidated if a control command such as access to a designated device is issued, with the corresponding part table maintained as it is, and then controlled so that the control command is not substantially performed without converting the virtual device into the physical device. An NIC may be controlled not to be substantially capable of performing communications. This enables the virtualization server 3102 subjected to deployment to be isolated from the network for business while the deployment is executed. The virtualization mechanism 3101 notifies completion of device invalidation to the management server 101 in the step 3204.

The management server 101 transmits a mini OS to the virtualization server 3102 subjected to deployment in step 3205. The virtualization server 3102 subjected to deployment boots the mini OS in step 3262. The virtualization server 3102 subjected to deployment copies a disc image to the storage device in step 3263. The virtualization server 3102 subjected to deployment reboots the mini OS in step 3264. The deployed OS is booted in step 3265.

The virtualization server 3102 subjected to deployment requests an OS setup parameter in step 3206. The management server 101 transmits an OS setup parameter to the virtualization server 3102 subjected to deployment in step 3207. The virtualization server 3102 subjected to deployment sets the OS setup parameter in step 3266. The virtualization server 3102 executes rebooting in step 3267. The virtualization server 3102 transmits an OS activation notification to the management server 101 in step 3208.

The management server 101 transmits parameters other than the OS setup parameter to the virtualization server 3102 subjected to deployment in step 3209. The virtualization server 3102 sets the parameters other than the OS setup parameter in step 3268. The virtualization server 3102 subjected to deployment transmits the setup completion notification of the parameters other than the OS setup parameter to the virtualization server 3102 subjected to deployment in step 3210.

An alert at time 3 is notified to the management server 101 in step 803. However, step 803 may be dropped depending on the type of the alert so that the steps subsequent to the step at time 3 proceed or the process ends in step 3210.

The management server 101 transmits a validation request of the invalidated device to the virtualization server 3102 in step 3211. The virtualization mechanism 3101 executes a process of recovering (validating) the invalidated device in step 3252. The process of recovering (validating) the device is conducted in the opposite manner of the above-mentioned step 3251 to be capable of executing a device control command. The virtualization mechanism 3101 notifies the management server 101 of validation completion of the device in step 3212.

The management server 101 requests the virtualization server 3102 subjected to deployment to reboot the OS in step 3213. The virtualization server 3102 subjected to deployment reboots the OS in step 3269. The virtualization server 3102 subjected to deployment notifies the management server 101 of OS activation in step 3214.

The management server 101 sends parameters other than the OS setup parameter to the virtualization server 3102 subjected to deployment in step 3215. The virtualization server 3102 subjected to deployment sets the parameters other than the OS setup parameter in step 3270. This step enables to set parameters that could not be set because the device had invalidated. The virtualization server 3102 subjected to deployment notifies the management server 101 of setup completion of the parameters other than the OS setup parameter in step 3216 and then the process ends.

Figure 29:
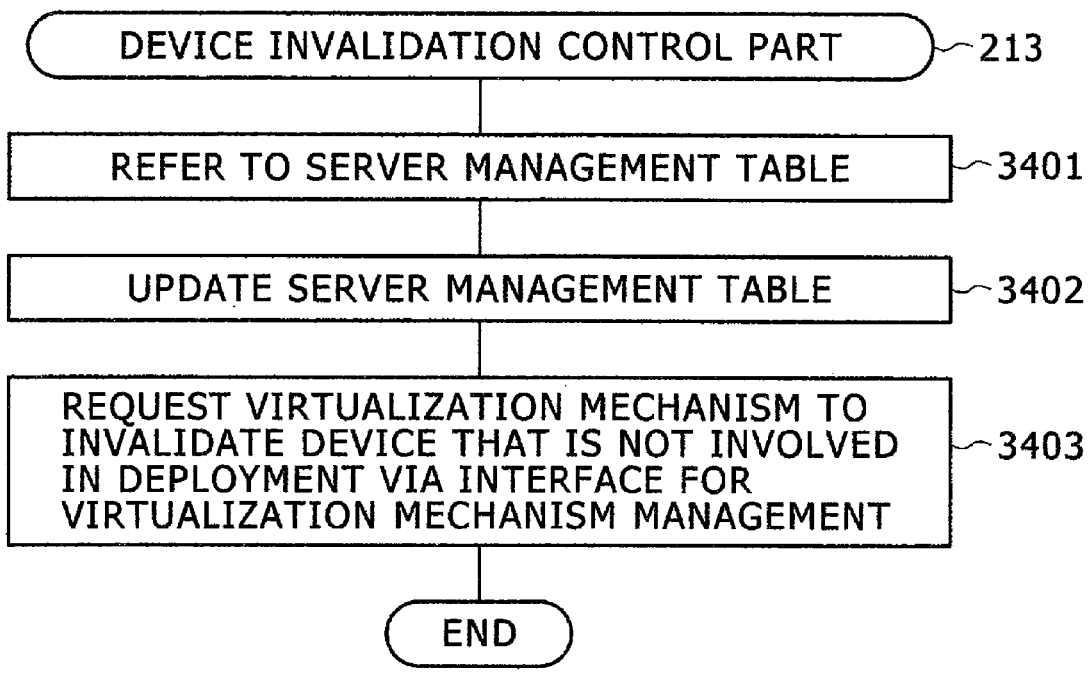
FIG. 29 is a flowchart illustrating a process performed by a device invalidation control part.

FIG. 29 is a flowchart illustrating a process performed by the device invalidation control part 213 according to the fourth embodiment. The server management table 221 is referred to in step 3401. The server management table 221 is updated in step 3402. A request is made to the BMC 305 to invalidate devices that are not involved in deployment in step 3403 and then the process ends. The management server 101 requests the virtualization mechanism 3101 to invalidate the virtual device that is not involved in the deployment via the interface 3111 for management of the virtualization mechanism and then the process ends. Specifically, a control is executed such as releasing the corresponding part between the physical device and the virtual device, blocking the virtual device, or suppressing communications of the virtual device. This enables the virtual server connected to the network for business via the virtual device to be isolated from the network for business. The method of releasing the corresponding part between the physical device and the virtual device or the method of suppressing the communications of the virtual device may also set even the parameters that can not be set unless the device is operated since the virtual device is under operation. The same effect may be also obtained for the disc interface 304 by providing the same device configuration. Further, since the storage device may be isolated by turning off the connection state while the deployment is executed, it is possible to protect data stored in the storage device from data corruption.

Figure 30:
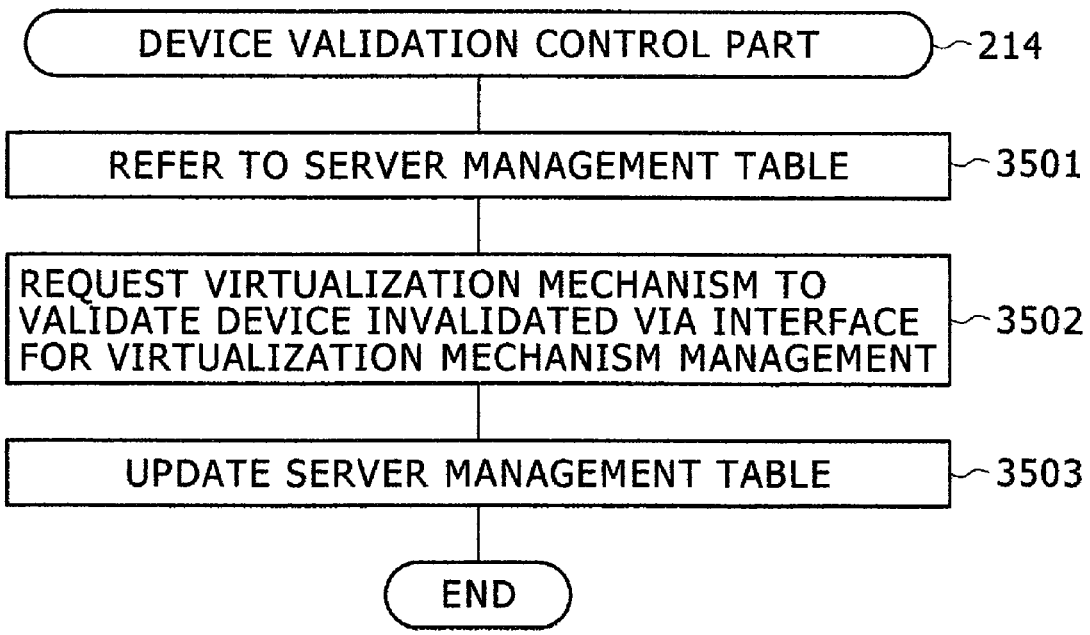
FIG. 30 is a flowchart illustrating a process performed by a device validation control part.

FIG. 30 shows a flowchart illustrating a process performed by the device validation control part 214. The server management table 221 is referred to in step 3501. A request is made to the virtualization mechanism 3101 to validate the invalidated device in step 3502. The virtualization mechanism 3101 performs recovering the corresponding part between the physical device and the virtual device, releasing the blocking of the virtual device for operation, and recovering the communication of the virtual device depending on the invalidation method. The server management table 221 is updated in step 3503 and then the process ends.

Figure 31:
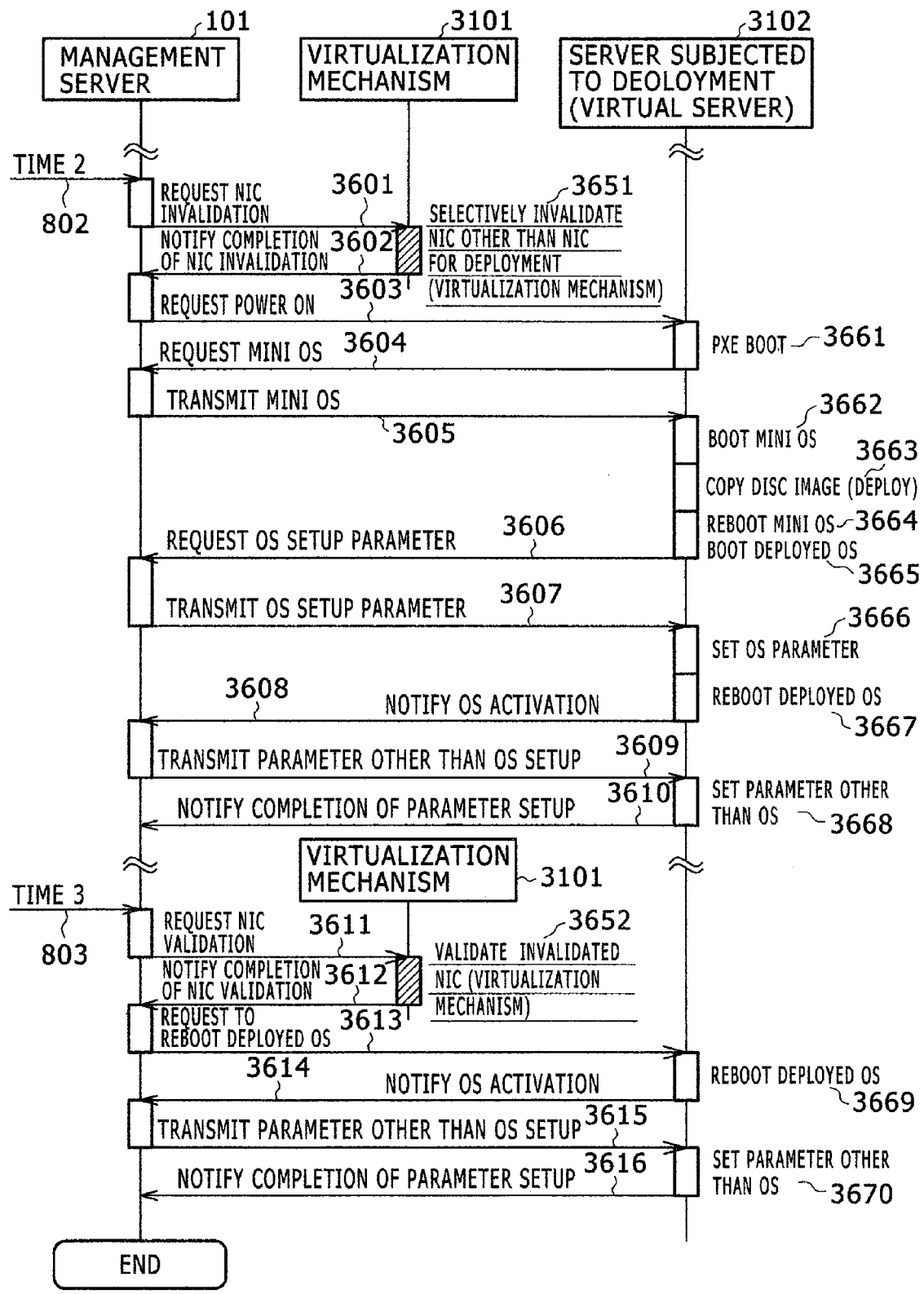
FIG. 31 is a view illustrating another operation order according to the fourth embodiment.

FIG. 31 is a view illustrating an operation sequence of the management server 101, the virtualization server 3102 subjected to deployment, and the virtualization mechanism 3101. FIG. 31 is different from FIG. 28 in timing of invalidating the device.

The time 1 corresponding to step 801 is identical to that of the first embodiment, and thus its descriptions will be omitted. An alert at time 2 is notified to the management server 101 in step 802. However, step 802 may be dropped depending on the type of alert so that the steps subsequent to the step at time 2 proceed or the process ends in the previous step (the process at time 1).

The management server 101 requests the virtualization mechanism 3101 to invalidate the device in step 3601. The management server 101 transfers the request to the virtualization mechanism 3101 through the interface 3111 for management of the virtualization mechanism.

The virtualization mechanism 3101 selectively invalidates a device unnecessary for deployment in step 3651. The invalidation method may include temporarily releasing the corresponding part between the physical device and the virtual device, temporarily blocking the virtual device, and suppressing communications of the virtual device. This enables the virtualization server 3102 subjected to deployment to be isolated from the network for business while the deployment is executed. The virtualization mechanism 3101 notifies completion of device invalidation to the management server 101 in step 3202.

The management server 101 requests the virtualization server 3102 subjected to deployment to power on in step 3203. The virtualization server 3102 subjected to deployment powers on to initiate PXE boot in step 3661.

The virtualization server 3102 subjected to deployment demands a mini OS from the management server 101 in step 3602. The management server 101 transmits the mini OS to the virtualization server 3102 subjected to deployment in step 3605. The virtualization server 3102 subjected to deployment boots the mini OS in step 3662. The virtualization server 3102 subjected to deployment copies a disc image to the storage device in step 3663. The virtualization server 3102 subjected to deployment reboots the mini OS in step 3664. The deployed OS is booted in step 3665.

The virtualization server 3102 subjected to deployment requests an OS setup parameter in step 3606. The management server 101 sends the OS setup parameter to the virtualization server 3102 subjected to deployment in step 3607. The virtualization server 3102 subjected to deployment sets the OS setup parameter in step 3666. The virtualization server 3102 subjected to deployment executes reboot in step 3667. The virtualization server 3102 subjected to deployment sends an OS activation notification to the management server 101 in step 3608.

The management server 101 sends parameters other than the OS setup parameter to the virtualization server 3102 subjected to deployment in step 3609. The virtualization server 3102 subjected to deployment sets the parameters other than the OS setup parameter in step 3668. The virtualization server 3102 subjected to deployment sends a setup completion notification of the parameters other than the OS setup parameter to the management server 101 in step 3610.

The order after the time 3 (803) is the same as shown in FIG. 28, and thus its descriptions will be omitted. An advantage of the process flow based on this order is that the process flow does not need to change from the process order of the common deployment. This facilitates application to the conventional deployment products or solutions using the deployment.

What is claimed is:
1. A method of building a system using a management server, the method comprising the steps of:
obtaining server information from a server connected to the management server through a network,
referring to the obtained server information, selecting a device unnecessary for deployment among devices connected to the server, and invalidating the selected device, wherein the server is a virtual server constructed onto a physical server, the device unnecessary for deployment is a virtual device other than a virtual NIC that is included in the virtual server for connecting to the management server through the network, and the invalidation includes releasing a corresponding part between the virtual device other than the virtual NIC and a physical device included in the physical server.

2. The method of building a system according to claim 1, wherein the releasing of the corresponding part includes blocking the virtual device.

3. The method of building a system according to claim 1, wherein when the virtual device other than the virtual NIC is another virtual NIC, the releasing of the corresponding part includes suppressing communication by another NIC.

4. A management server comprising:

a memory, and a CPU executing parts included in the memory, the memory including:

a server scanning part obtaining server information from a server connected to the management server through a network:

a deployment control part referring to the obtained server information to select a device unnecessary for deployment among devices connected to the server; and a device invalidation control part invalidating the selected device, wherein the server is a virtual server constructed onto a physical server, the device unnecessary for deployment is a virtual device other than a virtual NIC included in the virtual server for connecting to the management server through the network, and the device invalidation control part releases a corresponding part between the virtual device other than the virtual NIC and a physical device included in the physical server.

5. The management server according to claim 4, wherein the releasing of the corresponding part by the device invalidation control part includes blocking the virtual device.

6. The management server according to claim 4, wherein when the virtual device other than the virtual NIC is another NIC, the releasing of the corresponding part by the device invalidation control part includes suppressing the communication by another NIC.

* * * * *